US007489700B2

(12) United States Patent
Oogushi

(10) Patent No.: US 7,489,700 B2
(45) Date of Patent: Feb. 10, 2009

(54) VIRTUAL ACCESS ROUTER

(75) Inventor: Minoru Oogushi, Kokubunji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 863 days.

(21) Appl. No.: 10/715,840

(22) Filed: Nov. 19, 2003

(65) Prior Publication Data

US 2004/0165581 A1   Aug. 26, 2004

(30) Foreign Application Priority Data

Nov. 20, 2002   (JP) ............................. 2002-335934

(51) Int. Cl.
*H04L 12/56* (2006.01)
(52) U.S. Cl. ...................................... 370/409; 370/428
(58) Field of Classification Search ................ 370/389, 370/400, 352, 401
See application file for complete search history.

(56) References Cited

U.S. PATENT DOCUMENTS

| 6,754,622 | B1 * | 6/2004 | Beser et al. ................. 704/226 |
| 6,907,039 | B2 * | 6/2005 | Shen ........................... 370/400 |
| 7,085,827 | B2 * | 8/2006 | Ishizaki et al. .............. 709/223 |
| 7,225,236 | B1 * | 5/2007 | Puthiyandyil et al. ....... 709/218 |
| 7,340,535 | B1 * | 3/2008 | Alam .......................... 709/246 |
| 7,401,355 | B2 * | 7/2008 | Supnik et al. ................ 726/11 |
| 2002/0037010 | A1 | 3/2002 | Yamauchi |
| 2002/0067725 | A1 * | 6/2002 | Oguchi et al. ............... 370/390 |
| 2002/0133534 | A1 * | 9/2002 | Forslow ....................... 709/200 |
| 2002/0174211 | A1 * | 11/2002 | Ishizaki et al. .............. 709/223 |
| 2004/0165581 | A1 * | 8/2004 | Oogushi ...................... 370/352 |
| 2005/0257256 | A1 * | 11/2005 | Supnik et al. ................ 726/11 |
| 2006/0242290 | A1 * | 10/2006 | Ishizaki et al. .............. 709/223 |
| 2007/0110060 | A1 * | 5/2007 | Miki et al. ................... 370/389 |
| 2008/0175241 | A1 * | 7/2008 | Kalampoukas et al. ...... 370/392 |

FOREIGN PATENT DOCUMENTS

| EP | 0926859 | * | 6/1999 |
| EP | 1225725 | * | 7/2002 |
| JP | 2001-237898 | | 2/2000 |
| JP | 2001-268125 | | 3/2000 |
| JP | 2002-325090 | | 4/2001 |

OTHER PUBLICATIONS

Spalink et al. (Building a robust software-based router using network processors) Banff, Alberta, Canada Session: Event-driven architectures pp. 216-229 Year of Publication: 2001.*

(Continued)

*Primary Examiner*—Edan Orgad
*Assistant Examiner*—Salman Ahmed
(74) *Attorney, Agent, or Firm*—Reed Smith LLP; Juan Carlos A. Marquez, Esq.

(57) ABSTRACT

Access routers making up a LAC device or LNS device are given virtual router functions. The virtual routers are associated with either physical interfaces or fixed logical interfaces, L2TP tunnels, or PPP sessions. This allows one LAC device or LNS device to be connected with a plurality of L2TP transfer networks or ISP networks managed by different carriers.

19 Claims, 21 Drawing Sheets

OTHER PUBLICATIONS

Cluster-based virtual router; Jingguo Ge; Hualin Qian; Info-tech and Info-net, 2001. Proceedings. ICII 2001—Beijing. 2001 International Conferences on vol. 2, Oct. 29-Nov. 1, 2001 pp. 102-109 vol. 2.*
RFC2338 (Virtual Router Redundancy Protocol), 1998.*
Muthukrishnan, K., Malis, A., "A Core MPLS IP VPN Architecture", IETF RFC2917, IP VPN Architecture, Sep. 2000, pp. 1-16.
Japanese Office Action dated Jun. 3, 2008 regarding Japanese Patent Application No. 2003-384485, in Japanese with partial translation.
Partial translation of a Japanese Office Action dated Jun. 3, 2008 regarding Japanese patent application No. 2003-384485.
Yonchara, Akifumi, et al., "IP Switch Edge Router CX4200", NEC Technical Journal, vol. 54, No. 8, Aug. 24, 2001, 20 Pages.

* cited by examiner

FIG. 5A

| | VIRTUAL ROUTER | PHYSICAL I/F | PROTOCOL | LOGICAL I/F | Rx/Tx | ACTION | VIRTUAL ROUTER |
|---|---|---|---|---|---|---|---|
| 2021 | - | ATM_11 | PPPoE | PVC_11 | Rx | Decap_PPPoE | VR_1 |
| 2022 | VR_1 | - | PPP | PPPoE_11 | Rx | Map_L2TP | VR_1 |
| 2023 | VR_1 | - | PPP | Session_12 | Tx | Encap_L2TP | VR_1 |
| 2024 | VR_1 | - | L2TP | Tunnel_12 | Tx | Encap_UDP/IP | VR_1 |
| 2025 | VR_1 | - | IP | UDP_1701 | Tx | Route | VR_1 |
| 2027 | VR_1 | Ether_12 | IP | - | Tx | Forward | - |
| 2031 | - | Ether_12 | IP | - | Rx | Route | VR_1 |
| 2033 | VR_1 | - | UDP/IP | UDP_1701 | Rx | Decap_UDP/IP | VR_1 |
| 2034 | VR_1 | - | L2TP | Tunnel_12 | Rx | Decap_L2TP | VR_1 |
| 2035 | VR_1 | - | PPP | Session_12 | Rx | Map_PPPoE | VR_1 |
| 2036 | VR_1 | - | PPP | PPPoE_11 | Tx | Encap_PPPoE | VR_1 |
| 2037 | VR_1 | ATM_11 | PPPoE | PVC_11 | Tx | Forward | - |

FIG. 5B

| | VIRTUAL ROUTER | DESTINATION IP ADDRESS | ADDRESS MASK | SELF-ADDRESSED | NextHop ADDRESS | PHYSICAL I/F | LOGICAL I/F |
|---|---|---|---|---|---|---|---|
| 2026 | VR_1 | 192.168.20.1 | 255.255.255.0 | 0 | 192.168.10.2 | Ether_12 | - |
| 2032 | VR_1 | 192.168.10.1 | 255.255.255.0 | 1 | - | - | UDP_1701 |

FIG. 8A

| | VIRTUAL ROUTER | PHYSICAL I/F | PROTOCOL | LOGICAL I/F | Rx/Tx | ACTION | VIRTUAL ROUTER |
|---|---|---|---|---|---|---|---|
| 2121 | - | ATM_11 | PPPoE | PVC_11 | Rx | Decap_PPPoE | VR_0 |
| 2122 | VR_0 | - | PPP | PPPoE_11 | Rx | Map_L2TP | VR_0 |
| 2123 | VR_0 | - | PPP | Session_12 | Tx | Encap_L2TP | VR_1 |
| 2124 | VR_1 | - | L2TP | Tunnel_12 | Tx | Encap_UDP/IP | VR_1 |
| 2125 | VR_1 | - | IP | UDP_1701 | Tx | Route | VR_1 |
| 2127 | VR_1 | Ether_12 | IP | - | - | Forward | - |
| 2131 | - | Ether_12 | IP | - | Rx | Route | VR_1 |
| 2133 | VR_1 | - | UDP/IP | UDP_1701 | Rx | Decap_UDP/IP | VR_0 |
| 2134 | VR_0 | - | L2TP | Tunnel_12 | Rx | Decap_L2TP | VR_0 |
| 2135 | VR_0 | - | PPP | Session_12 | Rx | Map_PPPoE | VR_0 |
| 2136 | VR_0 | - | PPP | PPPoE_11 | Tx | Encap_PPPoE | VR_0 |
| 2137 | VR_0 | ATM_11 | PPPoE | PVC_11 | Tx | Forward | - |

FIG. 8B

| | VIRTUAL ROUTER | DESTINATION IP ADDRESS | ADDRESS MASK | SELF-ADDRESSED | NextHop ADDRESS | PHYSICAL I/F | LOGICAL I/F |
|---|---|---|---|---|---|---|---|
| 2126 | VR_1 | 192.168.20.1 | 255.255.255.0 | 0 | 192.168.10.2 | Ether_12 | - |
| 2132 | VR_1 | 192.168.10.1 | 255.255.255.0 | 1 | - | - | UDP_1701 |

FIG. 11A

| | VIRTUAL ROUTER | PHYSICAL I/F | PROTOCOL | LOGICAL I/F | Rx/Tx | ACTION | VIRTUAL ROUTER |
|---|---|---|---|---|---|---|---|
| 2221 | - | ATM_11 | PPPoE | PVC_11 | Rx | Decap_PPPoE | VR_0 |
| 2222 | VR_0 | - | PPP | PPPoE_11 | Rx | Map_L2TP | VR_1 |
| 2223 | VR_1 | - | PPP | Session_12 | Tx | Encap_L2TP | VR_1 |
| 2224 | VR_1 | - | L2TP | Tunnel_12 | Tx | Encap_UDP/IP | VR_1 |
| 2225 | VR_1 | - | IP | UDP_1701 | Tx | Route | VR_1 |
| 2227 | VR_1 | Ether_12 | IP | - | Tx | Forward | - |
| 2231 | - | Ether_12 | IP | - | Rx | Route | VR_1 |
| 2233 | VR_1 | - | UDP/IP | UDP_1701 | Rx | Decap_UDP/IP | VR_1 |
| 2234 | VR_1 | - | L2TP | Tunnel_12 | Rx | Decap_L2TP | VR_1 |
| 2235 | VR_1 | - | PPP | Session_12 | Rx | Map_PPPoE | VR_0 |
| 2236 | VR_0 | - | PPP | PPPoE_11 | Tx | Encap_PPPoE | VR_0 |
| 2237 | VR_0 | ATM_11 | PPPoE | PVC_11 | Tx | Forward | - |

FIG. 11B

| | VIRTUAL ROUTER | DESTINATION IP ADDRESS | ADDRESS MASK | SELF-ADDRESSED | NextHop ADDRESS | PHYSICAL I/F | LOGICAL I/F |
|---|---|---|---|---|---|---|---|
| 2226 | VR_1 | 192.168.20.1 | 255.255.255.0 | 0 | 192.168.10.2 | Ether_12 | - |
| 2232 | VR_1 | 192.168.10.1 | 255.255.255.0 | 1 | - | - | UDP_1701 |

FIG. 14A

| | VIRTUAL ROUTER | PHYSICAL I/F | PROTOCOL | LOGICAL I/F | Rx/Tx | ACTION | VIRTUAL ROUTER |
|---|---|---|---|---|---|---|---|
| 2321 | | Ether_21 | IP | | Rx | Route | VR_1 |
| 2323 | VR_1 | | UDP/IP | UDP_1701 | Rx | Decap_UDP/IP | VR_1 |
| 2324 | VR_1 | | L2TP | Tunnel_21 | Rx | Decap_L2TP | VR_1 |
| 2325 | VR_1 | | PPP | Session_21 | Rx | Decap_PPP | VR_1 |
| 2326 | VR_1 | | IP | | Rx | Route | VR_1 |
| 2328 | VR_1 | Ether_22 | IP | | Tx | Forward | |
| 2331 | | Ether_22 | IP | | Rx | Route | VR_1 |
| 2333 | VR_1 | | IP | Session_21 | Tx | Encap_PPP | VR_1 |
| 2334 | VR_1 | | PPP | Session_21 | Tx | Encap_L2TP | VR_1 |
| 2335 | VR_1 | | L2TP | Tunnel_21 | Tx | Encap_UDP/IP | VR_1 |
| 2336 | VR_1 | | IP | UDP_1701 | Tx | Route | VR_1 |
| 2338 | VR_1 | Ether_21 | IP | | Tx | Forward | |

FIG. 14B

| | VIRTUAL ROUTER | DESTINATION IP ADDRESS | ADDRESS MASK | SELF-ADDRESSED | NextHop ADDRESS | PHYSICAL I/F | LOGICAL I/F |
|---|---|---|---|---|---|---|---|
| 2322 | VR_1 | 192.168.20.1 | 255.255.255.0 | 1 | | | UDP_1701 |
| 2327 | VR_1 | 158.214.2.5 | 255.255.255.0 | 0 | 158.214.1.1 | Ether_22 | - |
| 2332 | VR_1 | 133.144.69.112 | 255.255.255.0 | 0 | | | Session_21 |
| 2337 | VR_1 | 192.168.10.1 | 255.255.255.0 | 0 | 192.168.20.2 | Ether_21 | - |

FIG. 17A

| | VIRTUAL ROUTER | PHYSICAL I/F | PROTOCOL | LOGICAL I/F | Rx/Tx | ACTION | VIRTUAL ROUTER |
|---|---|---|---|---|---|---|---|
| 2421 | - | Ether_21 | IP | - | Rx | Route | VR_0 |
| 2423 | VR_0 | - | UDP/IP | UDP_1701 | Rx | Decap_UDP/IP | VR_1 |
| 2424 | VR_1 | - | L2TP | Tunnel_21 | Rx | Decap_L2TP | VR_1 |
| 2425 | VR_1 | - | PPP | Session_21 | Rx | Decap_PPP | VR_1 |
| 2426 | VR_1 | - | IP | Session_21 | Rx | Route | VR_1 |
| 2428 | VR_1 | Ether_22 | IP | - | Tx | Forward | - |
| 2431 | - | Ether_22 | IP | - | Rx | Route | VR_1 |
| 2433 | VR_1 | - | IP | Session_21 | Tx | Encap_PPP | VR_1 |
| 2434 | VR_1 | - | PPP | Session_21 | Tx | Encap_L2TP | VR_0 |
| 2435 | VR_0 | - | L2TP | Tunnel_21 | Tx | Encap_UDP/IP | VR_0 |
| 2436 | VR_0 | - | IP | UDP_1701 | Tx | Route | VR_0 |
| 2438 | VR_0 | Ether_21 | IP | - | Tx | Forward | - |

FIG. 17B

| | VIRTUAL ROUTER | DESTINATION IP ADDRESS | ADDRESS MASK | SELF-ADDRESSED | NextHop ADDRESS | PHYSICAL I/F | LOGICAL I/F |
|---|---|---|---|---|---|---|---|
| 2422 | VR_0 | 192.168.20.1 | 255.255.255.0 | 1 | - | - | UDP_1701 |
| 2427 | VR_1 | 158.214.2.5 | 255.255.255.0 | 0 | 158.214.1.1 | Ether_22 | - |
| 2432 | VR_1 | 133.144.69.112 | 255.255.255.0 | 0 | - | - | Session_21 |
| 2437 | VR_0 | 192.168.10.1 | 255.255.255.0 | 0 | 192.168.20.2 | Ether_21 | - |

FIG. 20A

| VIRTUAL ROUTER | PHYSICAL I/F | PROTOCOL | LOGICAL I/F | Rx/Tx | ACTION | VIRTUAL ROUTER |
|---|---|---|---|---|---|---|
| - | Ether_21 | IP | - | Rx | Route | VR_0 |
| VR_0 | - | UDP/IP | UDP_1701 | Rx | Decap_UDP/IP | VR_0 |
| VR_0 | - | L2TP | Tunnel_21 | Rx | Decap_L2TP | VR_1 |
| VR_1 | - | PPP | Session_21 | Rx | Decap_PPP | VR_1 |
| VR_1 | - | IP | Session_21 | Rx | Route | VR_1 |
| VR_1 | Ether_22 | IP | - | Tx | Forward | - |
| - | Ether_22 | IP | - | Rx | Route | VR_1 |
| VR_1 | - | IP | Session_21 | Tx | Encap_PPP | VR_0 |
| VR_1 | - | PPP | Session_21 | Tx | Encap_L2TP | VR_0 |
| VR_0 | - | L2TP | Tunnel_21 | Tx | Encap_UDP/IP | VR_0 |
| VR_0 | - | IP | UDP_1701 | Tx | Route | VR_0 |
| VR_0 | Ether_21 | IP | - | Tx | Forward | - |

FIG. 20B

| VIRTUAL ROUTER | DESTINATION IP ADDRESS | ADDRESS MASK | SELF-ADDRESSED | NextHop ADDRESS | PHYSICAL I/F | LOGICAL I/F |
|---|---|---|---|---|---|---|
| VR_0 | 192.168.20.1 | 255.255.255.0 | 1 | - | - | UDP_1701 |
| VR_1 | 158.214.2.5 | 255.255.255.0 | 0 | 158.214.1.1 | Ether_22 | - |
| VR_1 | 133.144.69.112 | 255.255.255.0 | 0 | - | - | Session_21 |
| VR_0 | 192.168.10.1 | 255.255.255.0 | 0 | 192.168.20.2 | Ether_21 | - |

VIRTUAL ACCESS ROUTER

BACKGROUND OF THE INVENTION

The present invention relates to virtual functions of an access router and a network server.

Among technologies used at the edge of a backbone network or carrier network, there is a "virtual router function." Generally, the virtual router function refers to a function that allows one physical router to be handled as if it were two or more routers. Each of these virtual routers has independent routing information, and a variety of protocols including IP routing (ARP, ICMP, RADIUS, SNMP, etc.) run on each virtual router (VR1, VR2, . . .) independently. An outline of virtual router is disclosed in "A Core MPLS IP VPN Architecture", IETF RFC2917 published in September 2000.

JP-A-2001-268125 discloses a technology that provides a server for an intranet terminal line concentrator with a virtual router function to allow the user to select a desired VPN.

In recent years, the Internet access environment for end users is rapidly moving toward a broader band. To realize a broadband access, broadband access line technologies such as ADSL, FTTH and CATV are utilized. From a standpoint of business operation, broadband access currently available can be classified into two types: a "provider-integrated type access" and a "provider selection type access".

The "provider-integrated type access" refers to a business mode in which a single corporation totally provides a wide range of services including access lines and Internet connection service. The "provider selection type access" on the other hand refers to a work-specialized business mode in which an access line provider offers access lines such as ADSL and FTTH while the Internet connection service is provided by a plurality of Internet service providers (ISPs). Because of historical circumstances and ease of use on the part of users and ISPs, the provider selection type access is becoming a mainstream.

FIG. 1 shows an example network that realizes a conventional provider selection type access. A diagram shown below FIG. 1 illustrates a protocol stack used by each network device installed in the network. It is contemplated to use ADSL as an access line and PPPoE as an access protocol.

In a home of the user, a PC 101 is connected to an ADSL modem 102, which is then connected to a subscriber line. The subscriber line is connected to one of DSLAMs 111 owned by an access line provider that are co-located in a local exchange center. The subscriber lines are originally intended as part of a telephone exchange network for telephone service and are commonly used for analog telephone communication and ISDN communication. The DSLAM 111 is connected to LAC 112 which in turn is connected to a L2TP transfer network. The LAC is an abbreviation for L2TP Access Concentrator and is one kind of access router installed at the edge of the L2TP transfer network 113 on the user home side. The L2TP transfer network 113 is physically an ordinary IP network made up of ordinary IP routers but uses L2TP as a communication protocol. The L2TP is a tunneling protocol to send PPP frames through the IP networks and, for access networks, is practically a standard protocol. An access router at a start point of L2TP is an LAC and an access router at an end point of L2TP is LNS. On the ISP network side of the L2TP transfer network 113 is arranged an access router called LNS (L2TP Network Server). The LNSs are connected to ISP networks through GWs. The user now can access the Internet 150 through the associated ISP.

The access line provider is interconnected with a plurality of ISPs through its L2TP transfer network 113. The LNS is situated at the edge of the L2TP transfer network 113 and plays a role of a gateway router at an interconnecting point with ISP on the access line provider side. For interconnection with a plurality of ISPs, the access line provider requires a plurality of LNSs, one for each ISP. For setting up a plurality of L2TP tunnels in the L2TP transfer network, the same number of LACs as that of L2TP tunnels are required.

SUMMARY OF THE INVENTION

The conventional provider selection type access has the following problems with LAC or LNS.

1. Problems with LAC

The conventional LAC device cannot hold a plurality of routing information and has difficulty connecting with a plurality of independent IP networks. Therefore, although the L2TP transfer networks need only to be ordinary IP networks, access line providers conventionally build wide area networks on their own.

2. Problems with LNS

The conventional LNS devices cannot hold a plurality of routing information and has difficulty connecting with a plurality of independent IP network. Since individual ISPs are required to control IP addresses, routing information, quality of service, etc. according to their own policies, the access line provider must prepare a different LNS device for a different ISP, increasing the installation cost.

It is therefore an object of the present invention to provide a virtual access router that can eliminate the aforementioned problems experienced with conventional technologies.

To achieve the above objective, in one aspect of this invention, access routers making up a LAC or LNS are given virtual router functions. The access routers are provided with transmission/reception interfaces according to the attribute of received packets so that the process of forwarding packets that are sent or received via these interfaces can be assigned to a particular virtual router.

In one example of this invention, interfaces may be realized by assigning some of communication I/Fs provided in the access router to incoming packets with a particular attribute or by assigning packets of a particular attribute to a logical interface logically realized in the access router. The association between the virtual routers and the interfaces, i.e., mapping is not necessarily fixed but its setting can be modified by a management command input through a user interface such as management console. The management command may also be remotely input through a communication I/F.

With this invention, the use of the LAC function enables a single access router to connect to a plurality of L2TP transfer networks run by different carriers. The L2TP transfer networks are ordinary or just IP networks so that their interconnection among different carriers is easy, allowing two or more carriers to cooperate with each other to create a wide area access network.

Further, the use of the LNS function allows a single access router to connect to a plurality of ISP networks. It also allows an IP address space and a routing domain on the L2TP transfer network side, and an IP address space and a routing domain on the ISP network side to be designed independently. The LNS function also allows carriers with L2TP transfer networks and ISP carriers to cooperate with each other more easily. In addition to the above, this invention solves problems described in SUMMARY OF THE INVENTION section.

BRIEF DESCRIPTION OF THE DRAWINGS

FIGS. 5A and 5B illustrate a logical interface table and a routing information table used in the first embodiment.

FIGS. 8A and 8B illustrate a logical interface table and a routing information table used in the second embodiment.

FIGS. 11A and 11B illustrate a logical interface table and a routing information table used in the third embodiment.

FIGS. 14A and 14B illustrate a logical interface table and a routing information table used in the fourth embodiment.

FIGS. 17A and 17B illustrate a logical interface table and a routing information table used in the fifth embodiment.

FIGS. 20A and 20B illustrate a logical interface table and a routing information table used in the sixth embodiment.

DETAILED DESCRIPTION OF THE EMBODIMENTS

As for the mapping method described above, the following six kinds of the mapping method are currently in use.

1) LAC type fixed mapping method: a method in an access router with a LAC function which associates each physical interface or fixed logical interface with a virtual router.
2) LAC type L2TP mapping method: a method in an access router with a LAC function which associates each L2TP tunnel with a virtual router.
3) LAC type PPP mapping method: a method in an access router with a LAC function which associates each PPP session with a virtual router.
4) LNS type fixed mapping method: a method in an access router with a LNS function which associates each physical interface or fixed logical interface with a virtual router.
5) LNS type L2TP mapping method: a method in an access router with a LNS function which associates each L2TP tunnel with a virtual router.
6) LNS type PPP mapping method: a method in an access router with a LNS function which associates each PPP session with a virtual router.

In the following embodiments, descriptions will be made according to the above methods 1) to 6). In the embodiments that follow, the LAC function is a function to form a L2TP tunnel in a L2TP transfer network, the LNS function is a function to terminate the L2TP tunnel formed by the LAC, and the backbone network is an entire network which, when viewed from a particular access router, is closer to a core network. For example, in a network topology of FIG. 1, the backbone network as seen from the LAC denotes all networks situated on the rear side including the L2TP transfer network, and the backbone network as seen from the LNS denotes all networks situated on the rear side, including ISP networks, which are closer to the core network. A management context means an operation mode that allows for a variety of settings for the access router.

EXAMPLE CONFIGURATION OF ACCESS ROUTER

Figure 2:
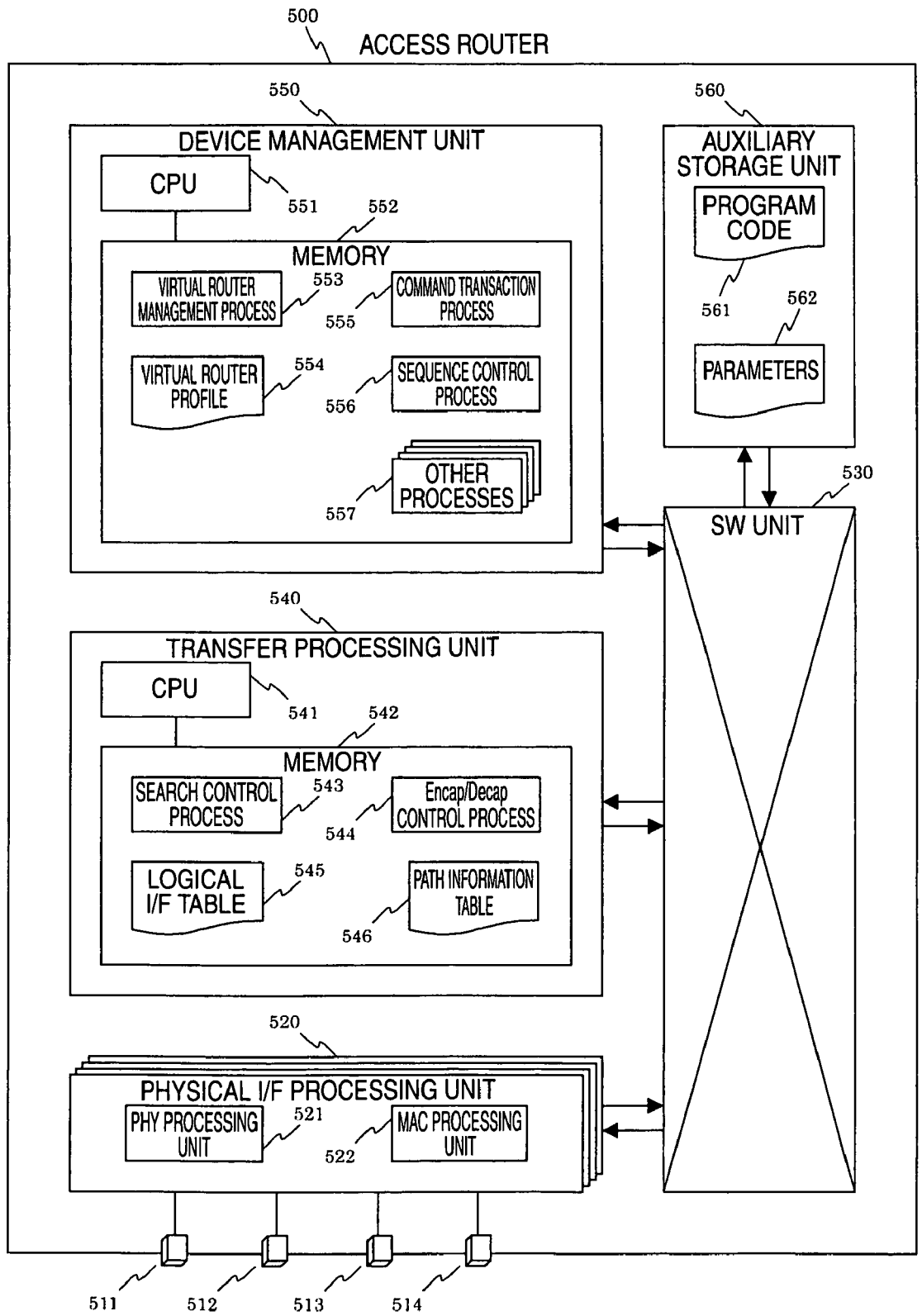
FIG. 2 illustrates an example internal configuration of an access router embodying the present invention.

FIG. 2 shows an example configuration of an access router 500 to be described in the following embodiments.

A physical I/F processing unit 520 terminates physical interfaces 511-514. A PHY processing unit 521 performs modulation/demodulation and analog/digital conversion on analog signals. A MAC processing unit 522 performs a medium access control for Ethernet and ATM and sends to and receives from the SW unit 530 packet data of layer 2 or higher that does not depend on the kind of physical interface.

Since the physical I/F processing unit 520 does not need to be aware of a virtual router function, it can be configured in the form of a card module so that it can easily be added. All function units except for the physical I/F processing unit 520 and SW unit 530 must be able to operate independently for each virtual router. Independent operation for each virtual router may be realized by a plurality of methods. For example, it may involves mounting the same number of independently operating processors as that of the virtual routers; using a common processor but running the same number of independent processes as that of the virtual router; or using a common processor and a common process but employing internal virtual router identifiers. In this configuration the method using the virtual router identifiers will be explained. In this case, mapping to virtual routers can be realized by marking individual packets with virtual router identifiers.

The SW unit 530 transfers packets received at the physical I/F processing unit 520 to respective function blocks.

A transfer processing unit 540 is a function unit to perform the mapping processing on the packets received by the physical I/F processing unit 520 and the routing control processing on the received packets. More specifically, the transfer processing unit 540 identifies attributes of packets received through physical interfaces such as PPP sessions and L2TP tunnels to map them to virtual routers and also performs IP routing for the received packets. A hardware construction includes a table memory 542 storing a logical I/F table 545 and a routing information table 546, and a CPU 541. At the start of the device the CPU 541 is loaded with a program stored in an auxiliary storage unit 560 to execute a search control process 543 and an Encap/Decap control process 544. The search control process 543 searches for the logical I/F table 545 and the routing information table 546 and hands the search result over to the Encap/Decap control process 544. The search control process 543 also controls a search order. In the search for the routing information table 546, a physical I/F identifier and a logical I/F identifier are used as key entries to search virtual router identifiers, protocol categories and other option information. The Encap/Decap control process 544 performs packet encapsulation and decapsulation based on the search result of the logical I/F table 545. Contents of the logical I/F table 545 and routing information table 546 will be detailed later. Since the logical I/F table 545 and the routing information table 546 have very large volumes of data, their processing is accelerated by using dedicated hardware such as ASICs, parallel processors and CAM memories.

A device management unit 550 performs an overall control of the access router 500. Various application processes are run in this block. Among the processes to be executed here are, for example, a routing process of OSPF and BGP, a management process of SNMP agents, a remote log-in process of Telnet server, and an AAA process of RADIUS clients. These processes are run with different settings for different virtual routers, and their own IP addresses and IP addresses of their remote peers for messaging are also managed differently for each virtual router. These setting information and collected statistic information are identified and managed using virtual router identifiers.

As for the hardware construction, the device management unit 550 comprises a memory 552 and a CPU 551, and at the start of the device, programs for executing a variety of application processes are loaded from the auxiliary storage unit 560 into the CPU 551. A virtual router management process 553 controls a generation/elimination of virtual routers, mapping settings of each virtual router, and various resource settings/operation settings. These virtual router configuration information is managed in a virtual router data profile 554. Depending on whether the operation setting is for LAC type or LNS type and which of the fixed mapping, L2TP mapping and PPP mapping is used, a linkage and an exclusive control between virtual routers are controlled.

A sequence control process 556 controls connection establishment sequences for PPP and L2TP. It executes various connection establishment sequence in coordination with the virtual router management process 553 and the virtual router data profile 554.

A command transaction process 555 offers a shell function to a console port and a Telnet log-in port and accepts a variety of commands. It analyzes the content of a command received and requests the virtual router management process 553 to change the corresponding configuration information. For example, when a command to add/change a mapping setting is executed, a corresponding entry is added to a logical I/F table 531. The command transaction process 555 has contexts associated with virtual router identifiers and manages an authority for each command in each context.

The auxiliary storage unit 560 stores program codes 561 and a parameter group 562 containing default setting and user setting. The program codes 561 denote a variety of applications that the CPUs 551, 541 execute, and are loaded into memories 542, 552 at the start of the device. Examples of the program codes 561 include a routing process such as OSPF and BGP, a management process such as SNMP agent, a remote log-in process such as Telnet server, and an AAA process such as RADIUS client. These processes are run with different settings in different virtual routers. Their own IP addresses and IP addresses of their remote peers for messaging are also managed differently from one virtual router to another. These setting information and collected statistic information are identified and managed using virtual router identifiers. While this embodiment is contemplated to use a flash memory as the auxiliary storage, other storage means such as EPROM may also be used.

First Embodiment

Figure 3:
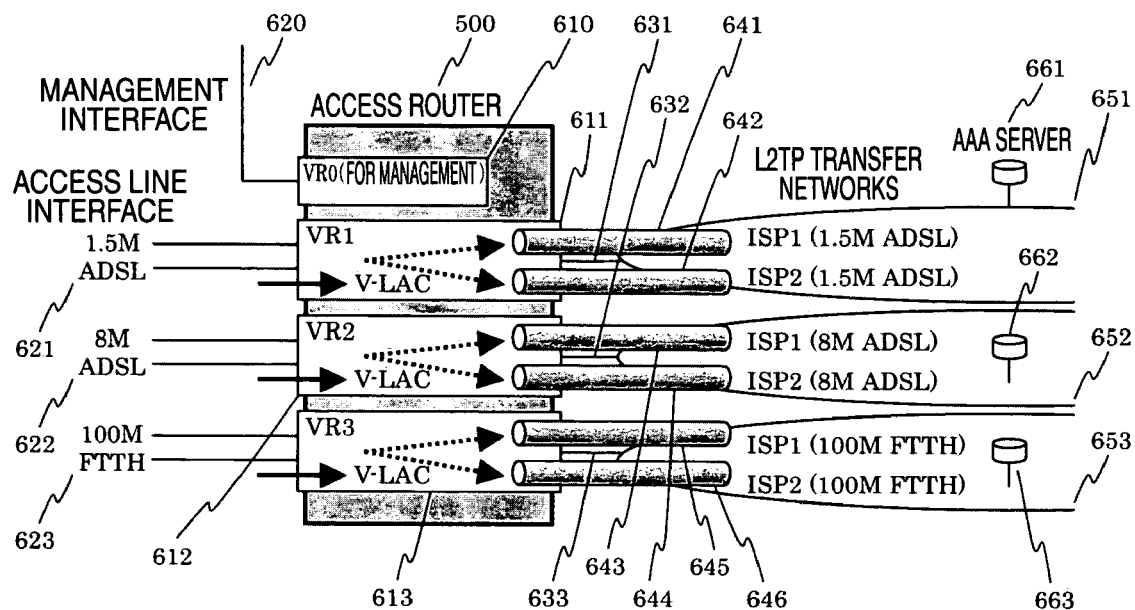
FIG. 3 illustrates an example configuration of a first mapping method as a first embodiment.
Figure 4:
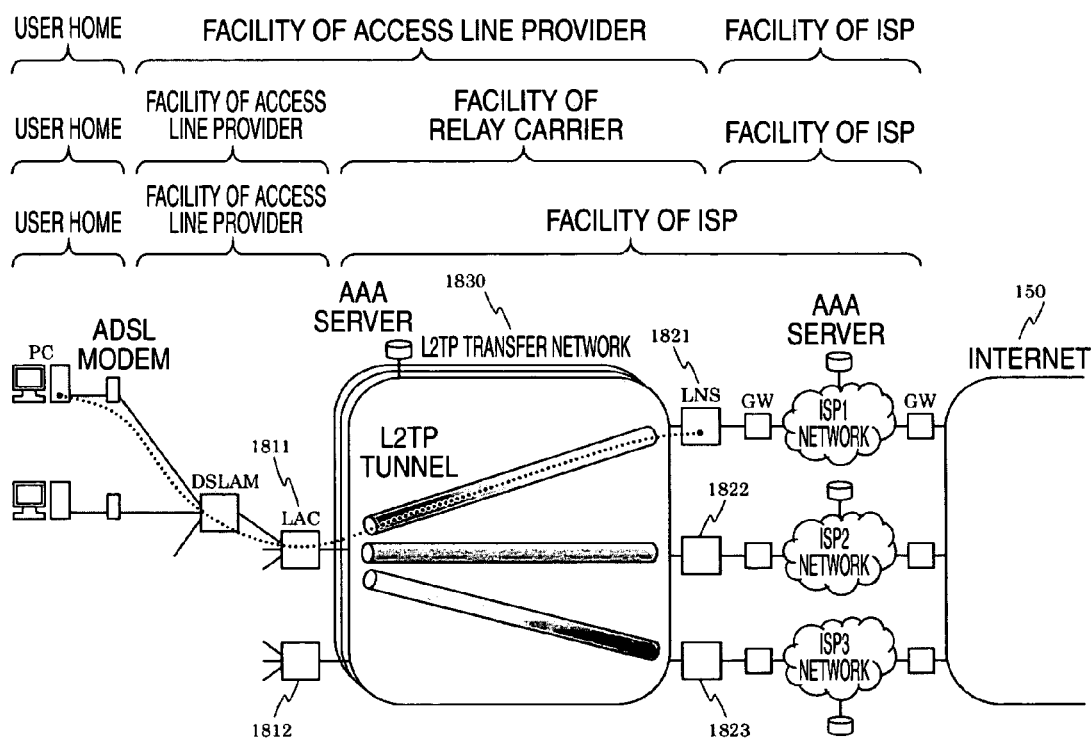
FIG. 4 illustrates an example topology of a network in which an LAC device of the first embodiment is installed.

FIG. 3 is an example implementation of a first mapping method (LAC type fixed mapping method) as a first embodiment and illustrates a configuration of access router and network. FIG. 4 shows a topology of the network in which the LAC devices of this embodiment are installed. Unless otherwise specifically noted, it is assumed that the LAC and LNS devices to be described in the subsequent embodiments are installed in the network shown in FIG. 4.

VR0 (610) is a special virtual router with an administrative authority over the entire access router 500 and is managed by an access line provider. An interface 620 associated with the VR0 (610) is a management interface for access through Telnet and SNMP. The administrator, for example, may execute Telnet via the interface 620 to log in to the context of VR0 (610) to generate VR1-3 (611-613) or associate access line interfaces 621-623 with VR1-3 (611-613).

The access line interfaces 621-623 are either physical interfaces fixedly associated with VR1-3 (611-613) or fixed logical interfaces multiplexed onto physical interfaces by the administrative authority of VR0 (610). Similarly, L2TP transfer network interfaces 631-633 are either physical interfaces fixedly associated with VR1-3 (611-613) or fixed logical interfaces multiplexed to physical interfaces by the administrative authority of VR0 (610). Examples of fixed logical interfaces multiplexed to physical interfaces include ATM PVC, IEEE802.1Q TAG VLAN, MPLS label routing and, in the case of multiplexing a plurality of protocols on the physical interfaces, sub-interfaces which are units of settings corresponding to respective protocols.

VR1-3 (611-613) are equivalent to conventional LAC type access routers paralleled in a unit cubicle of the access router 500. This is represented by "V-LAC" (Virtual-LAC) marked below each of the VR1-3 (611-613) in FIG. 3. A PPP session that has arrived on the access line interface 621 is fixedly mapped to VR1 (611).

Similarly, PPP sessions that have arrived on the access line interfaces 622, 623 are fixedly mapped to VR2 (612), VR3 (613). The L2TP to which these PPP sessions are multiplexed is a protocol on UDP/IP but a self IP address and an IP address of an associated LNS are managed for each of the VR1-3 (611-613) independently so that no problem occurs if IP address spaces overlap among the VR1-3 (611-613). This means that L2TP transfer networks 651-653 can be built independently of each other without having to be aware of the presence of one another. Since L2TP transfer networks need only be a simple IP network, a new service of "relaying L2TP tunnels", nonexistent so far and different from the access line providing service or ISP service, can be set up. In that case, an access line provider can connect to a plurality of relay carriers' networks 651-653 by using a single access router 500.

VR1-3 (611-613) have an administrative authority over interfaces assigned to themselves but not for the entire access router 500. This means that it is possible for the access line provider to wholesale (transfer or assign the management authority over) the VR1-3 (611-613) as virtual LAC devices to carriers that own the L2TP transfer networks 651-653. Since the access line provider has an administrative authority over the VR0 (610), i.e., an administrative authority over the entire access router 500, they can monitor the operating conditions of the VR1-3 (611-613) whose management authorities were assigned to the carrier having the L2TP transfer networks 651-653. The access line provider can also set an authority assignment level as required or issue a mandatory command based on a supervisor authority.

VR1-3 (611-613) play a role of edge node in the relay carrier to which they were wholesaled. A routing domain can be built in each of L2TP transfer networks 651-653 independently by running routing protocols such as OSPF and BGP with independent settings in each of VR1-3 (611-613).

A single LAC device has conventionally been able to generate only a single L2TP tunnel, but the provision of a virtual router function of this embodiment in the LAC device makes it possible to generate separate tunnels for different access line service categories as well as for different ISPs. The service category means a kind of access line (ADSL, FTTH, etc.), an access line band (1.5 Mbps, 8 Mbps, 12 Mbps, 24 Mbps, 40 Mbps, 100 Mbps, etc.) and a QoS class (band guarantee, delay guarantee, etc.). In FIG. 3, the circuits are designed so that users, even if contracted to the same ISP1, are assigned different incoming access line interfaces 621, 622, 623 depending on whether they are 1.5 Mbps ADSL users, 8 Mbps ADSL users or 100 Mbps FTTH users. Therefore, the virtual router at the accommodating station branches into VR1-3 (611-613) which are then multiplexed into L2TP tunnels 641, 643, 645. The L2TP transfer networks 651, 652, 653 are IP networks built specifically for 1.5 Mbps ADSL service, 8 Mbps ADSL service and 100 Mbps FTTH service respectively and allow for network designs suited to individual services such as access control and band control. By utilizing the virtual router function in this manner, it is possible to provide an optimum network design for each service category offered to the user. This also applies similarly to the services of ISP2 and ISP3 and to their user.

The VR1-3 (611-613) cooperate with the AAA servers 661-663 respectively in determining the L2TP tunnels to multiplex PPP sessions. The AAA servers have concentrated transactions such as authorization and accounting and are thus required to realize a mechanism for distributing a load in order to accommodate a large number of users. With this embodiment, by distributively accommodating a large number of users in a plurality of virtual routers, a natural distribution of load of the AAA servers can be realized without using a specially developed function for load distribution. If a network is prepared which commonly connects to VR1-3 (611-613), a single AAA server may be shared among the VR1-3 (611-613). This architecture is advantageous when building a medium scale access network accommodating not so many users.

FIG. 5A and FIG. 5B show a content of the logical I/F table 545 and routing information table 546 used in this embodiment. The logical I/F table has a virtual router field 2001 for storing virtual router identifiers, a physical I/F field 2002 for storing physical I/F identifiers, a protocol field 2003 for storing identifiers representing a kind of protocol of a received packet, a logical I/F field 2004 for storing logical I/F identifiers, a direction field 2005 for storing a value indicating whether the physical I/F and logical I/F of interest are a communication I/F to transmit packets or one to receive them, an action field 2006 for storing information specifying processing to be executed on the packet, and a virtual router field 2007. A physical I/F identifier may use, for example, an appropriate number added to the protocol used by that session to which the received packet belongs, such as ATM_11 and Ether_12, or simply use a port number.

The routing information table 546 has a virtual router field 2011 for storing virtual router identifiers, a destination IP address field 2012 for storing destination IP addresses of received packets, an address mask field 2013 for storing an address mask, a self-address field 2014 for storing an identifier indicating whether a packet to be processed is a self-addressed packet or not, a next hop address field 2015 for storing an address of a next hop node, a physical I/F field 2016 for storing physical I/F identifiers, and a logical I/F field 2017 for storing logical I/F identifiers.

Figure 6:
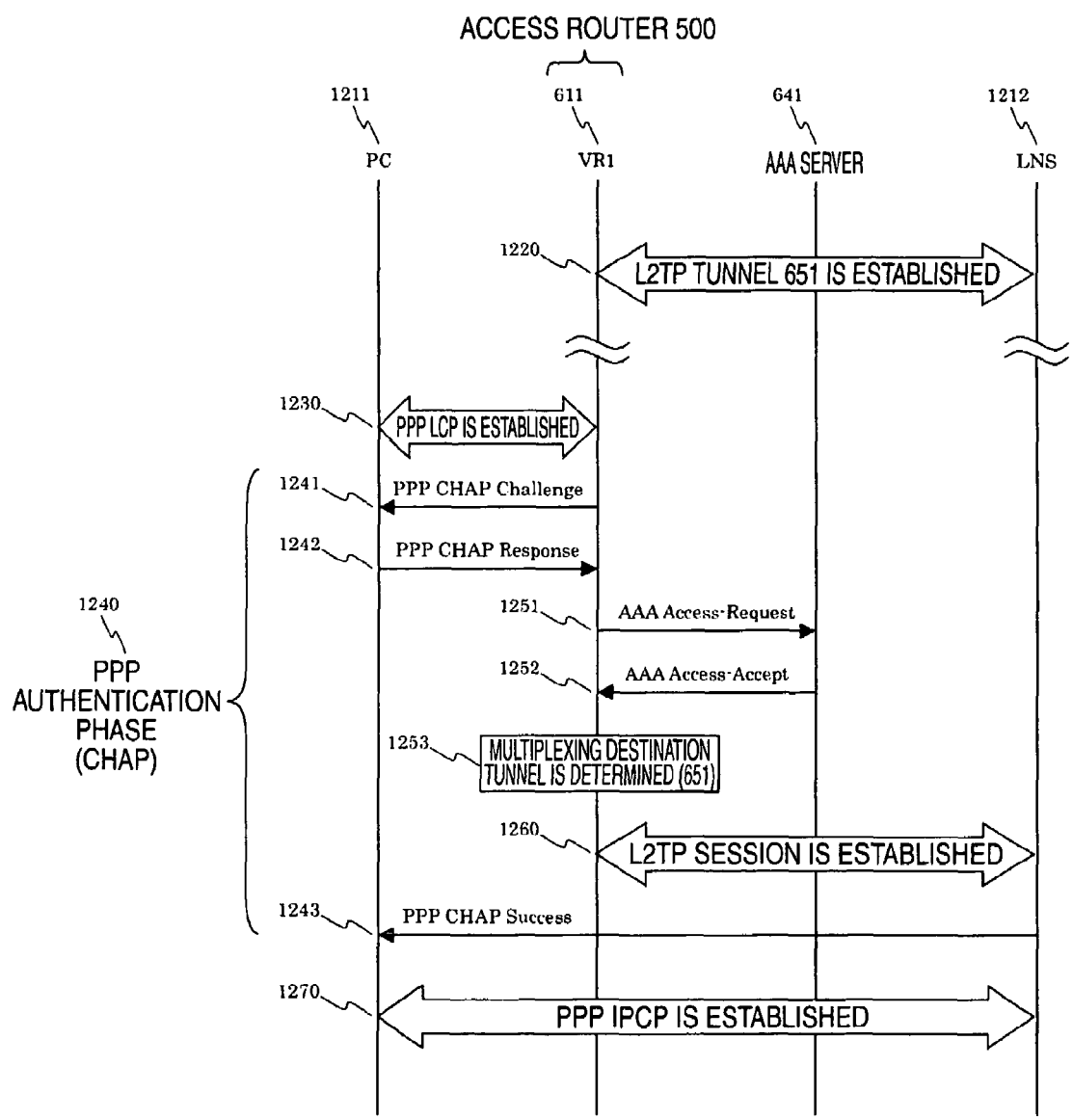
FIG. 6 illustrates an example connection establishment sequence in the mapping method of the first embodiment.

FIG. 6 shows an example connection sequence in this embodiment. In the access router configuration of FIG. 2, the execution of the connection sequence is controlled by a sequence control unit 573. The sequence control unit 573, in cooperation with a virtual router management unit 571 and a virtual router configuration table 572, checks whether the operation setting is of LAC type or LNS type and whether the mapping setting is a fixed mapping or L2TP mapping or PPP mapping, and executes the associated sequence of FIG. 6 accordingly.

The LAC of this embodiment offers the following advantages.

1) Since one LAC device can hold a plurality of routing information, the connection with a plurality of independent IP networks is made easy. This allows the use, as L2TP transfer networks, of a plurality of IP networks offered by a plurality of access line providers or communication carriers. This in turn makes for a variety of business modes.
2) Since the management authority over a LAC device can be assigned to an access line provider/communication carrier for each virtual router realized in the LAC device, there is a possibility of new business modes arising in which the access line provider may wholesale (transfer or assign the management authority over) any or all of the functions.
3) There is no need to ground different LAC devices for different service categories and only one LAC device needs to be grounded. This offers a significant advantage for access line providers in terms of cost.
4) Since individual virtual routers cooperate with different AAA servers respectively, the sessions accommodated in the entire device can be distributed to virtual routers. This has the same effect of executing an AAA server load distribution using the conventional technology.

Second Embodiment

Figure 7:
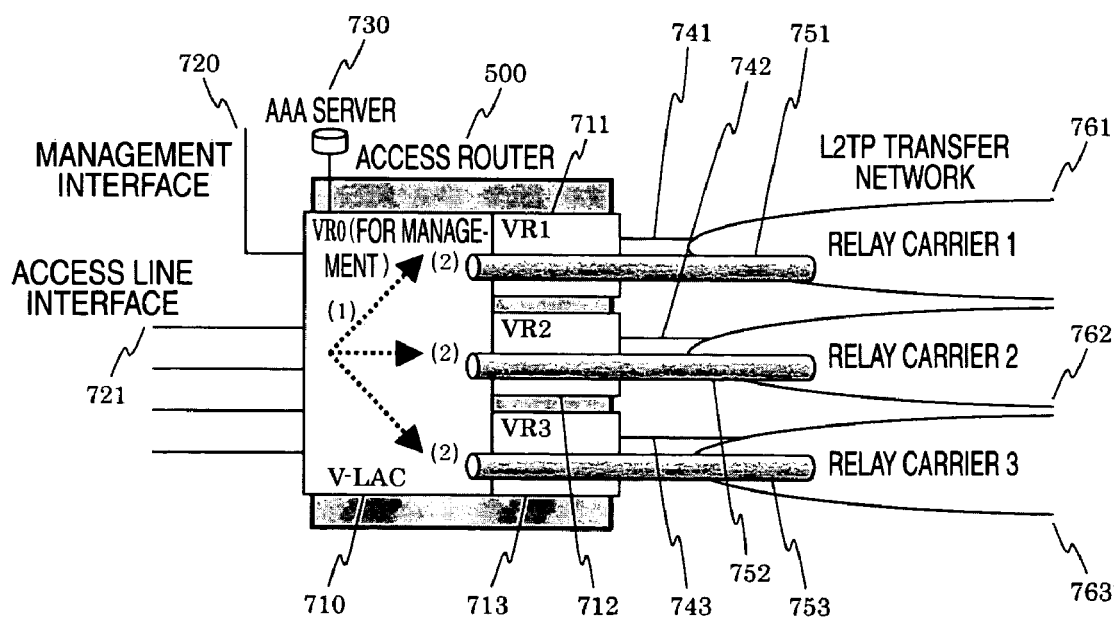
FIG. 7 illustrates an example configuration of a second mapping method as a second embodiment.

FIG. 7 is an example implementation of a second mapping method (LAC type L2TP mapping method) according to this invention and shows a configuration of an access router and a network.

VR0 (710) has an administrative authority over the entire access router 500 as in the case of the first embodiment, except that it has a role of managing all access line interfaces 721. The VR0 (710), as with an ordinary LAC device, receives a PPP connection request from a user and, in cooperation with an AAA server 730, determines based on domain identification information (example: "isp1.co.jp") to which of L2TP tunnels 751-753 the connection is to be multiplexed (procedure (1)). Next, the L2TP tunnels 751-753 are mapped to VR1-3 (711-713) (procedure (2)) and are managed by the virtual routers. Self IP addresses of the tunnels and IP addresses of the associated LNS are managed as routing information for each virtual router independently. L2TP transfer network interfaces 741-743 are either physical interfaces fixedly associated with VR1-3 (711-71) or fixed logical interfaces multiplexed onto physical interfaces by the administrative authority of VR0 (710).

The L2TP transfer networks 761-763 are connected to VR1-3 (711-713) respectively and thus can be built without having to be aware of the presence of one another. In this way a "L2TP tunnel relaying service" similar to the one in the first embodiment can be provided. In that case, an access line provider can connect to networks 761-763 of a plurality of relay carriers by using a single access router 500.

The VR0 (710) is a dedicated virtual router for management by an access line provider and at the same time is a "representative VR" that offers a major part of a LAC function in that it manages the multiplexing of all PPP sessions to L2TP tunnels. It therefore looks like a conventional LAC type access router. This is represented by "V-LAC" (Virtual-LAC) marked below the VR0 (710) in the figure.

Unlike the first embodiment, the AAA server 730 is connected to VR0 (710) and manages the multiplexing of all PPP sessions to L2TP tunnels. The AAA server 730 need only be able to communicate with VR0 (710) through IP and does not need to be directly connected. For example, an access line provider may build an IP network dedicated for management so that the VR0 (710) and the AAA server 730 can IP-communicate with each other via the management interface 720.

The VR1-3 (711-713) can be wholesaled (management authority of VR1-3 can be transferred or assigned) to associated relay carriers 1-3 who are then entrusted to manage settings of VR1-3. It should be noted, however, that while the object to be wholesaled in the first embodiment is a "virtual LAC device", the object to be wholesaled in this embodiment is a "virtual router device" and that most of basic settings for the LAC device falls within a range of management by VR0 (710) and are outside the range of management by VR1-3 (711-713). Setting information outside the range of management authority of VR1 (711) include, for example, a setting of AAA server 730 to be queried and a setting on the method of multiplexing PPP sessions to L2TP protocol. However, if a special setting is made to transfer the management authority from VR0 (710) to VR1 (711), even those settings unique to the LAC device can be set by overwriting the setup information on L2TP tunnel 751 with information retrieved from the AAA server 730. The same also applies to VR2 (712) and VR3 (713).

The VR1-3 (711-713) play a role of edge node in relay carriers to which these virtual routers are wholesaled. Independent routing domains can be set up in the individual L2TP transfer networks 761-763 by running routing protocols, such as OSPF and BGP, in individual VR1-3 (711-713) with independent settings.

Since in this mapping method the virtual routers to which user accesses are mapped are controlled for each L2TP tunnel, the decision on the L2TP tunnel to which a PPP session is multiplexed directly leads to determining the virtual router to be used. The procedure for determining the L2TP tunnel for multiplexing is similar to that used in the conventional LAC device and uses domain identification information as described earlier. As in a third embodiment to be described later, the domain identification information may contain service identification information so that the virtual router and the L2TP transfer networks to be used can be determined according to the service identification information specified by the PPP session.

FIG. 8A and FIG. 8B show a content of the logical I/F table 545 and routing information table 546 used in this embodiment. The logical I/F table has a virtual router field 2101 for storing virtual router identifiers, a physical I/F field 2102 for storing physical I/F identifiers, a protocol field 2103 for storing identifiers representing a kind of protocol of a received packet, a logical I/F field 2104 for storing logical I/F identifiers, a direction field 2105 for storing a value indicating whether the physical I/F and logical I/F of interest are a communication I/F to transmit packets or one to receive them, an action field 2106 for storing information specifying processing to be executed on the packet, and a virtual router field 2107. A physical I/F identifier may use, for example, an appropriate number added to the protocol used by that session to which the received packet belongs, such as ATM_11 and Ether_12, or simply use a port number.

The routing information table 546 has a virtual router field 2111 for storing virtual router identifiers, a destination IP address field 2112 for storing destination IP addresses of received packets, an address mask field 2113 for storing an address mask, a self-address field 2114 for storing an identifier indicating whether a packet to be processed is a self-addressed packet or not, a next hop address field 2115 for storing an address of a next hop node, a physical I/F field 2116 for storing physical I/F identifiers, and a logical I/F field 2117 for storing logical I/F identifiers.

Figure 9:
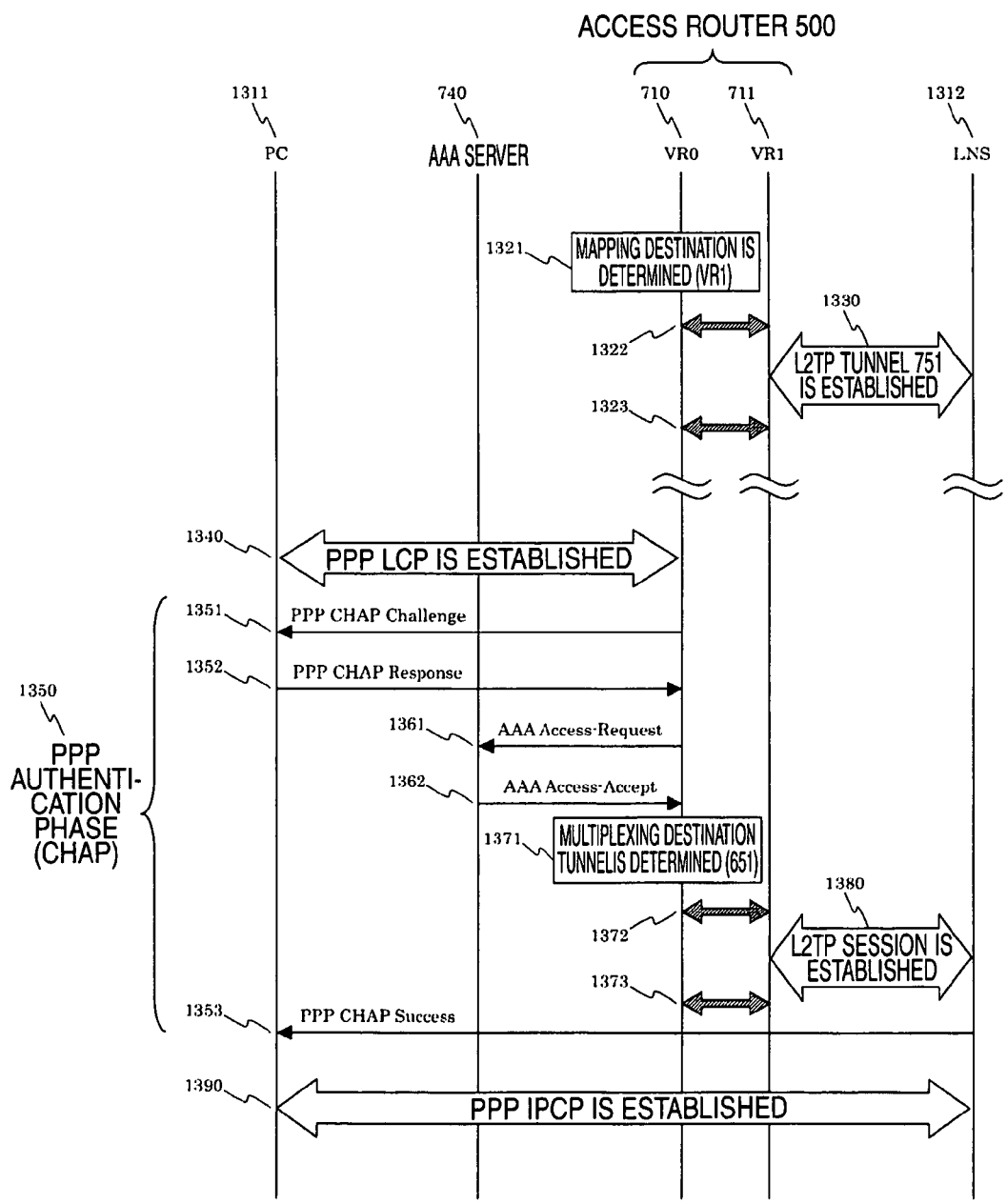
FIG. 9 illustrates an example connection establishment sequence in the mapping method of the second embodiment.

FIG. 9 shows an example connection sequence in this embodiment. In the access router configuration of FIG. 2, the execution of the connection sequence is controlled by a sequence control unit 573. The sequence control unit 573, in cooperation with a virtual router management unit 571 and a virtual router configuration table 572, checks whether the operation setting is of LAC type or LNS type and whether the mapping setting is a fixed mapping or L2TP mapping or PPP mapping, and executes the associated sequence of FIG. 9 accordingly.

The LAC of this embodiment offers the following advantages.

1) Since one LAC device can hold a plurality of routing information, the connection with a plurality of independent IP networks is made easy. This allows the use, as L2TP transfer networks, of a plurality of IP networks offered by a plurality of access line providers or communication carriers. This in turn makes for a variety of business modes.
2) Since the management authority over a LAC device can be assigned to an access line provider/communication carrier for each virtual router realized in the LAC device, there is a possibility of new business modes arising in which the access line provider may wholesale (transfer or assign the management authority over) any or all of the functions.
3) There is no need to ground different LAC devices for different service categories and only one LAC device needs to be grounded. This offers a significant advantage for access line providers in terms of cost.

Further, while in the first embodiment the mapping of a particular user to a virtual router is fixed, this embodiment dynamically determines the mapping when a session is established, making it possible to offer different services even to the same user by using a different router at time of a different connection.

Third Embodiment

Figure 10:
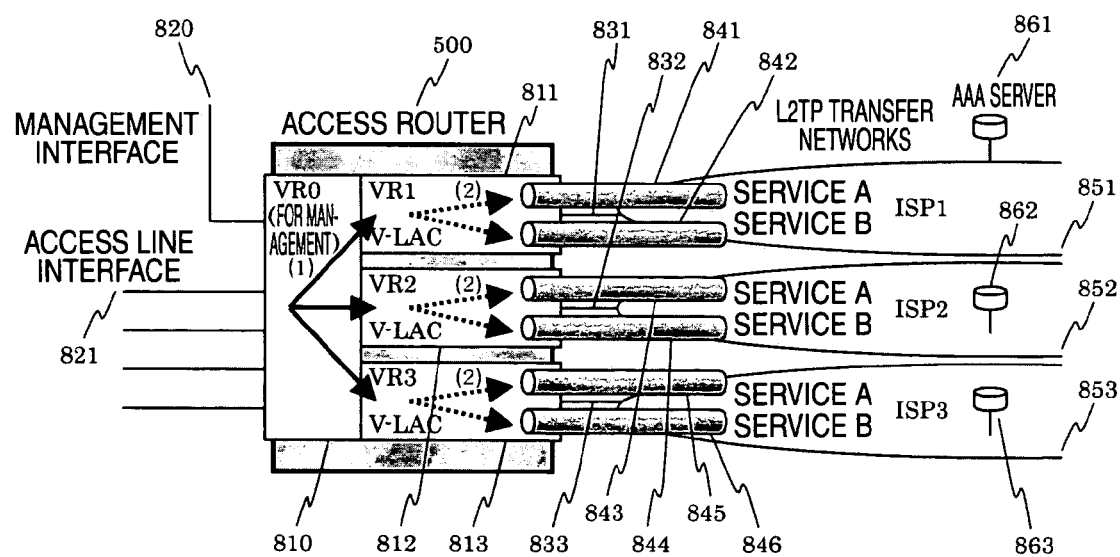
FIG. 10 illustrates an example configuration of a third mapping method as a third embodiment.

FIG. 10 is an example implementation of a third mapping method (LAC type PPP mapping method) according to this invention and shows a configuration of an access router and a network.

In this embodiment, domain identification information making up a user information character string has a structure of "service-a.isp1.co.jp", where "service-a" is service identification information and "isp1.co.jp" is ISP identification information. The service identification information represents a service category, such as maximum allowable bandwidth and QoS class.

VR0 (810) has an administrative authority over the entire access router 500 as in the case of the first embodiment, and also has a function of managing all access line interfaces 821 as in the second embodiment. The VR0 (810), as with an ordinary LAC device, receives a PPP connection request from a user and, based on the ISP identification information (example: "isp1.co.jp"), determines to which of VR1-3 (811-813) the PPP connection request is to be mapped (procedure (1)). That is, all the PPP connection requests from the users contracted to ISP1 are assigned to VR1 (811). The VR1 (811), as if it were an ordinary LAC device, receives the PPP connection request, cooperates with the AAA server 861 and uses the service identification information (example: "service-a") to determine a L2TP tunnel 841 for multiplexing (procedure (2)). The same also applies to VR2 (812) and VR3 (813). It is therefore possible to build separate L2TP transfer networks 851-853, one for each ISP, and also construct a L2TP tunnel 841-846 for each service category in each ISP.

The VR0 (810) is a dedicated virtual router for management by an access line provider and at the same time is a "representative VR" in that it manages all access line interfaces 821 and also manages the mapping of PPP sessions to VR1-3 (811-813). It should be noted, however, that it is VR1-3 (811-813), the mapping destination of PPP sessions, that cooperate with the AAA servers 861-863 and offer LAC functions such as multiplexing PPP sessions to L2TP tunnels 841-846. That is, VR1-3 (811-813) appear like conventional LAC type access routers. This is represented by "V-LAC" (Virtual-LAC) marked at the lower left of the VR1-3 (811-813).

L2TP transfer network interfaces 831-833 are either physical interfaces fixedly associated with VR1-3 (811-813) or fixed logical interfaces multiplexed onto physical interfaces by the administrative authority of VR0 (810).

The VR1-3 (811-813) can be wholesaled (management authority of VR1-3 can be transferred or assigned) to associated ISP1-3 who are then entrusted with the management of VR1-3. While the object to be wholesaled is a "virtual LAC device" as in the first embodiment, the management authority of the L2TP function in the VR1-3 (811-813) may be limited by the supervisor authority of VR0 (810), as situation demands. In this embodiment, the L2TP transfer networks 851-853 are contemplated to be IP networks owned by ISP1-3, and therefore VR1-3 (811-813) can be operated as if they were edge nodes of ISP1-3. By running the routing protocols such as OSPF and BGP with independent settings in individual VR1-3 (811-813), it is possible to build an independent routing domain in each of the L2TP transfer networks 851-853. Further, the AAA servers 861-863 that work with VR1-3 (811-813) are installed in the respective L2TP transfer networks 851-853. As described above, this embodiment allows for a business mode in which the virtual LAC device, L2TP transfer networks and AAA servers are managed by ISPs themselves, not the access line providers.

Since different VR1-3 (811-813) work with different AAA servers 861-863, the load of the AAA servers can be distributed in a natural way as in the first embodiment.

In this embodiment, an example has been described in which the mapping of PPP sessions to VR1-3 (811-813) done in VR0 (810) (procedure (1)) is performed based on a sub-information character string embedded in the user information character string. The information on which the mapping is based may also include any desired attribute information that can take a different value for a different PPP session. Examples of such attribute information include a value of Service-Name that a user terminal such as PC informs in a PADR message when a PPPOE session is established, a VR1-3 (811-813) resource occupation information when a PPP connection request is received, and congestion information on each L2TP transfer network 851-853 retrieved from the AAA servers 861-863 or other network monitoring servers.

FIG. 11A and FIG. 11B show a content of the logical I/F table 545 and routing information table 546 used in this embodiment. The logical I/F table has a virtual router field 2201 for storing virtual router identifiers, a physical I/F field 2202 for storing physical I/F identifiers, a protocol field 2203 for storing identifiers representing a kind of protocol of a received packet, a logical I/F field 2204 for storing logical I/F identifiers, a direction field 2205 for storing a value indicating whether the physical I/F and logical I/F of interest are a communication I/F to transmit packets or one to receive them, an action field 2206 for storing information specifying processing to be executed on the packet, and a virtual router field 2207. A physical I/F identifier may use, for example, an appropriate number added to the protocol used by that session to which the received packet belongs, such as ATM_11 and Ether_12, or simply use a port number.

The routing information table 546 has a virtual router field 2211 for storing virtual router identifiers, a destination IP address field 2212 for storing destination IP addresses of received packets, an address mask field 2213 for storing an address mask, a self-address field 2214 for storing an identifier indicating whether a packet to be processed is a self-addressed packet or not, a next hop address field 2215 for storing an address of a next hop node, a physical I/F field 2216 for storing physical I/F identifiers, and a logical I/F field 2217 for storing logical I/F identifiers.

Figure 12:
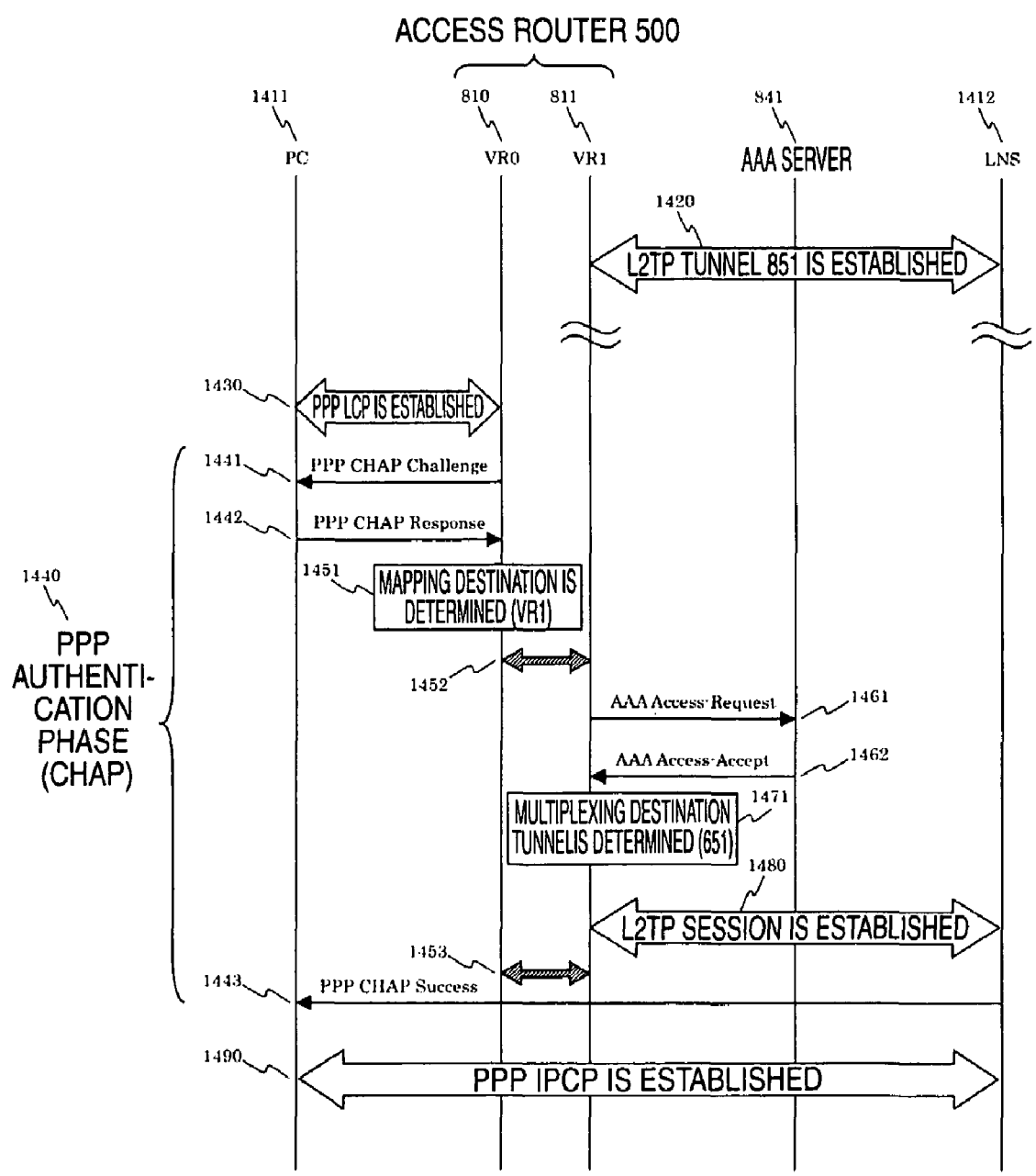
FIG. 12 illustrates an example connection establishment sequence in the mapping method of the third embodiment.

FIG. 12 shows an example connection sequence in this embodiment. In the access router configuration of FIG. 2, the execution of the connection sequence is controlled by a sequence control unit 573. The sequence control unit 573, in cooperation with a virtual router management unit 571 and a virtual router configuration table 572, checks whether the operation setting is of LAC type or LNS type and whether the mapping setting is a fixed mapping or L2TP mapping or PPP mapping, and executes the associated sequence of FIG. 12 accordingly.

As described above, in addition to the four advantages obtained with the first embodiment, the LAC of this embodiment can produce the following effects.

While in the first embodiment the mapping of a particular user to a virtual router is fixed, this embodiment dynamically determines the mapping when a session is set up, making it possible to offer different services even to the same user by using a different router at time of a different connection.

Further, an ISP with a wide area IP network can use their IP network as a L2TP transfer network by directly connecting it to the LAC of this embodiment.

Fourth Embodiment

Figure 13:
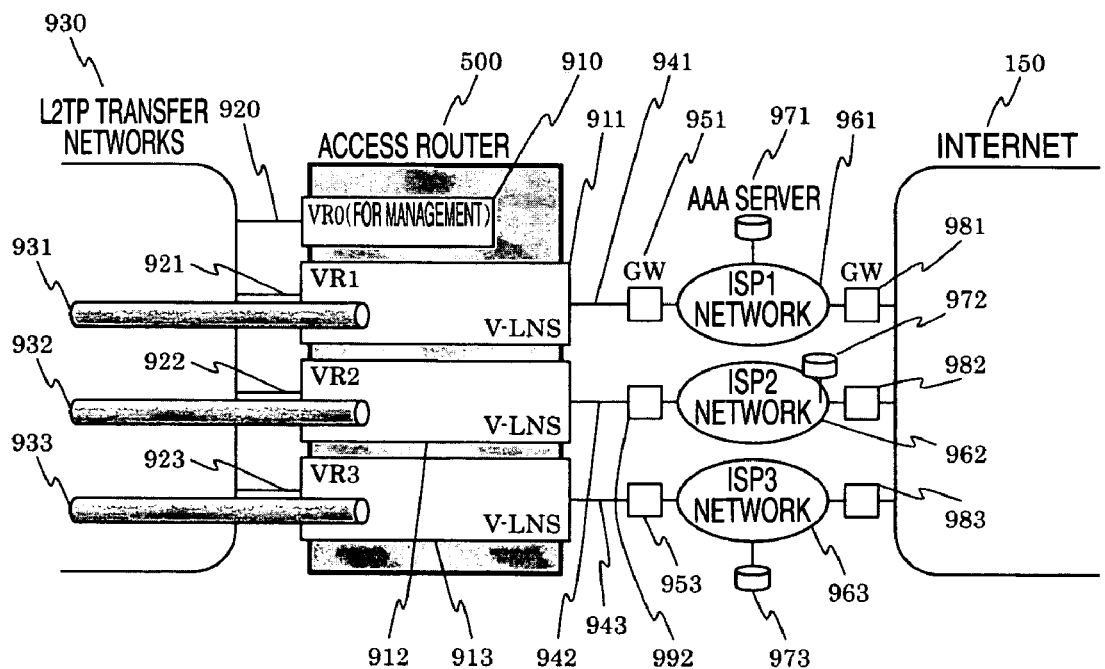
FIG. 13 illustrates an example configuration of a fourth mapping method as a fourth embodiment.

FIG. 13 is an example implementation of a fourth mapping method (LNS type fixed mapping method) according to this invention and illustrates a configuration of access router and network.

VR0 (910) is a special virtual router with an administrative authority over the entire access router 500 and is managed by an access line provider or a carrier having a L2TP transfer network 930. An interface 920 associated with the VR0 (910) is a management interface for access via Telnet and SNMP, as in the first embodiment. For example, an administrator may execute Telnet through the interface 920 to log in to a context of the VR0 (910) to generate VR1-3 (911-913) and associate the L2TP transfer network interfaces 921-923 with VR1-3 (911-913).

VR1-3 (911-913) are equivalent to conventional LNS type access routers paralleled in a unit cubicle of the access router 500. This is represented by "V-LNS" (Virtual-LNS) marked at the lower right of each of the VR1-3 (911-913) in FIG. 13. A L2TP tunnel 931 that was received on the L2TP transfer network interface 921 and a L2TP session multiplexed onto the tunnel are fixedly mapped to VR1 (911). Similarly, L2TP tunnels 932, 933 received on L2TP transfer network interfaces 922, 923 and L2TP sessions multiplexed onto these tunnels are fixedly mapped to VR2 (912) and VR3 (913), respectively.

FIG. 14A and FIG. 14B show a content of the logical I/F table 545 and routing information table 546 used in this embodiment. The logical I/F table has a virtual router field 2301 for storing virtual router identifiers, a physical I/F field 2302 for storing physical I/F identifiers, a protocol field 2303 for storing identifiers representing a kind of protocol of a received packet, a logical I/F field 2304 for storing logical I/F identifiers, a direction field 2305 for storing a value indicating whether the physical I/F and logical I/F of interest are a communication I/F to transmit packets or one to receive them, an action field 2306 for storing information specifying processing to be executed on the packet, and a virtual router field 2307. A physical I/F identifier may use, for example, an appropriate number added to the protocol used by that session to which the received packet belongs, such as ATM_11 and Ether_12, or simply use a port number.

The routing information table 546 has a virtual router field 2311 for storing virtual router identifiers, a destination IP address field 2312 for storing destination IP addresses of received packets, an address mask field 2313 for storing an address mask, a self-address field 2314 for storing an identifier indicating whether a packet to be processed is a self-addressed packet or not, a next hop address field 2315 for storing an address of a next hop node, a physical I/F field 2316 for storing physical I/F identifiers, and a logical I/F field 2317 for storing logical I/F identifiers.

A mapping process will be explained by referring to FIG. 14A and FIG. 14B. In FIG. 14A and FIG. 14B, since the virtual router identifiers are all VR_1, the operation is equivalent to that of the conventional LNS device. When a packet arrives, entries are searched in the order from line 2321 to line 2328. When line 2321 is retrieved, an IP packet is taken in from Ether_21 and the search control process 543 searches through the logical I/F table 545 to find that the packet matches an entry 2321. According to the action "Route", the packet is transferred to the IP routing. When line 2322 is retrieved, the received IP packet is found to have a destination IP address of 192.168.20.1. The routing information table 546 is searched to find that the packet matches an entry 2322 and that it is self-addressed (L2TP interface). A UDP destination port of 1701 (L2TP receive port) is obtained. When line 2323 is retrieved, the search control process 543 returns to the logical I/F table 545 and searches it for the UDP port 1701 to find that the packet matches an entry 2323. The Encap/Decap control process 544 decapsulates a UDP/IP header. When line 2324 is retrieved, the search control process 543 searches through the logical I/F table 545 with a L2TP header tunnel ID as a key and hits an entry 2324. The Encap/Decap control process 544 decapsulates the L2TP header. When line 2325 is retrieved, the process searches through the logical I/F table 545 again with a L2TP header session ID as a key and hits an entry 2325. The Encap/Decap control process 544 decapsulates the PPP header. When line 2326 is retrieved, the IP packet, which is the user data, is picked up and transferred to the IP routing. When line 2327 is retrieved, the destination IP address of the IP packet is found to be 158.214.2.5 (user's communication destination). The process searches through the routing information table 546 and hits an entry 2327 and finds that the output destination physical I/F is Ether_22. When line 2328 is retrieved, the process searches through the logical I/F table 545 and hits an entry 2328. According to the action "Forward", the search control process 543 transfers the IP packet to the physical I/F processing unit 520 and requests it to send the IP packet from Ether_22.

During a process of transmitting a packet, entries are retrieved in the order from line 2331 to line 2338. The order of steps is reverse to that of the packet receiving process.

Interfaces 941-943 that connect VR1-3 (911-913) to the networks (961-963) of ISP1-3 are physical interfaces or fixed logical interfaces fixedly associated with VR1-3 (911-913) respectively by the administrative authority of VR0 (910). IP packets making up user data that user terminals such as PCs send or receive are encapsulated in PPP as they are transmitted from the user terminals to the access router 500. But since the L2TP layer and PPP layer are terminated at VR1-3, the packets are handled as pure IP packets on the interfaces 941-943.

The VR1-3 (911-913) behave as if they were independent LNS devices. For example, VR1 (911) can set, independently of other virtual routers VR2 (912) and VR3 (913) without having to be aware of their presence, a host name of the LNS used when setting up a L2TP tunnel 931, an IP address that terminates the tunnel, information on the associated AAA server 971, information on IP addresses to be assigned to user terminals such as PCs, routing control information, quality-of-service control information, etc. As described above, by running VR1-3 (911-913) as independent virtual LNS devices to be connected to ISP1-3 respectively, a single physical cubicle (device) of access router 500 can connect to a plurality of ISPs. This relieves an access line provider or a carrier having a L2TP transfer network 930 of the need to install as many LNS devices as the ISPs connected to the L2TP transfer network 930. ISP1-3 networks (961-963) are separated from each other in terms of networking and maintain independence of routing information from the others. So, the ISPs can make routing settings freely without having to be aware of the presence of one another. Even if ISP1-3 use the same private IP address space, since they are not aware of the presence of the others, each ISP can occupy the address space independently. Such a high level of independence of a variety of network resources is not feasible with the conventional LNS device and thus the above-mentioned operation that uses a single physical cubicle or device to process connections to a plurality of ISPs has not been practiced.

The VR1-3 (911-913) have a management authority over the interface assigned to themselves but not over the entire access router 500. This means that it is possible for an access line provider or a carrier having a L2TP transfer network 930 to wholesale (transfer or assign the management authority over) the VR1-3 (911-913) as virtual LNS devices to Internet service providers. Since the access line provider or carrier with the L2TP transfer network 930 has an administrative authority over the VR0 (910), i.e., an administrative authority over the entire access router 500, they can monitor the operating conditions of the VR1-3 (911-913) whose management authorities were assigned to the ISP1-3. The access line provider or carrier with the L2TP transfer network 930 can also set an authority assignment level as required or issue a mandatory command based on a supervisor authority.

GW951-953 play an equivalent role to that of GW141 shown in FIG. 3 and are necessary, for example, in blocking an IP packet whose source IP address is other than an actually assigned one in order to prevent an unauthorized access from a user or in running a routing protocol such as OSPF and BGP to automate the routing control.

Figure 1:
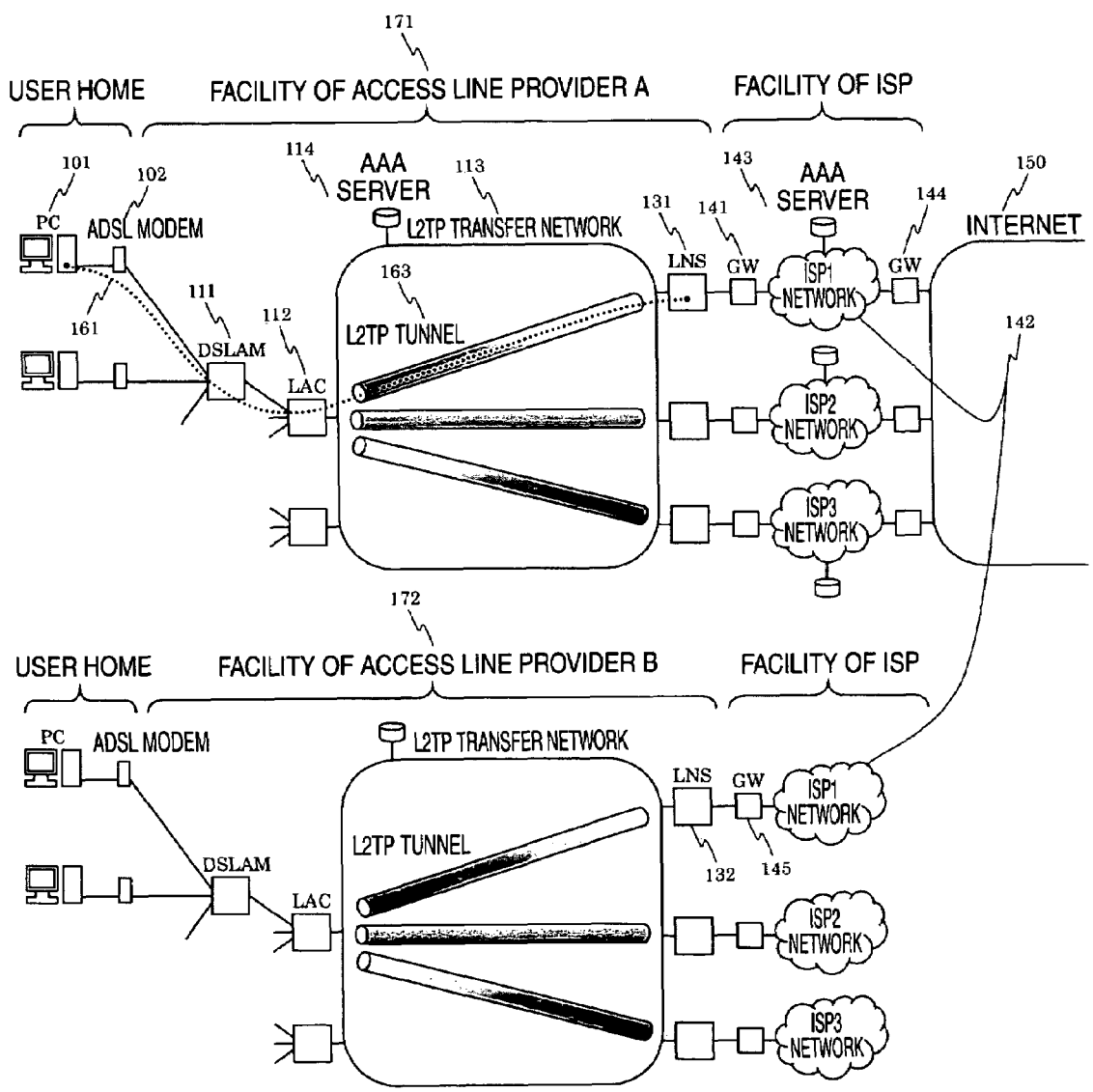
FIG. 1 illustrates an example implementation of a conventional provider selection type access.

In this embodiment, VR1 (911) for example is connected to both the L2TP transfer network 930 and the ISP1 network 961. This means that the L2TP transfer network 930 and the ISP1 network 961 share an IP address space. Since the L2TP transfer network 930 and the ISP1 network 961 are closed area networks, there are times when they use private IP addresses. When both of the L2TP transfer network 930 and the ISP1 network 961 use private IP addresses, it is necessary to be aware of the other network's IP address design in making the IP address setting and the routing control setting on VR1 (911) and GW951. The same can also be said of VR2 (912) and GW952, and VR3 (913) and GW953. This situation is. similar to that when the conventional technology of FIG. 1 is used.

The IP addresses assigned to user terminals such as PCs connected to ISP1 are assigned by VR1 (911) using IPCP. The IP address space is allocated to a space managed by the ISP1 network 961. That is, the user terminals such as PCs are logically end nodes directly accommodated in the ISP1 network 961. Therefore, when the ISP1 network 961 uses private IP addresses, the user terminals such as PCs are also assigned private IP addresses. Communication to the Internet 150 requires global IP addresses. In such a case, GW981 needs to have a NAT function to convert a private IP address of a terminal into a global IP address capable of communicating with the Internet 150. This also applies to GW982 and GW983.

As described above, the user terminals such as PCs are handled as if they were directly accommodated in the ISP1 network 961. This means that in normal operation the presence of L2TP transfer network 930 is hidden from the user terminals such as PCs and that IP communications are not permitted between the user terminals such as PCs and nodes in the L2TP transfer network 930. That is, VR1 (911) receives an IP packet transmitted from a user terminal such as PC in a format that is encapsulated in PPP and L2TP and then decapsulates the L2TP and PPP to extract the original IP packet. Whatever its destination IP address, the IP packet needs to be routed fixedly to GW951. For that purpose, VR1 (911) is able to make setting on a policy routing to forcibly route to GW951 the IP packet received on the PPP session established between the user terminal and the VR1 (911). The same also applies to VR2 (912) and VR3 (913). This situation is similar to that when the conventional technology of FIG. 1 is used.

As described above, VR1 (911) performs transmission and reception of IP packets between it and user terminals such as PCs in a format encapsulated in PPP and L2TP. It is noted, however, that as in normal IP routers, IP packets of a format not encapsulated in PPP and L2TP (pure IP format) are allowed to be routed between the L2TP transfer network 930 and the ISP1 network 961. However, since the L2TP transfer network 930 is managed not by ISP1 but by an access line provider or relay carrier, one might not wish to permit the pure IP packet routing from a security standpoint. In that case, it is possible in VR1 (911) to set a packet filtering that prohibits the pure IP packet routing. The same also applies to VR2 (912) and VR3 (913). This situation is similar to that when the conventional technology of FIG. 1 is used.

Figure 15:
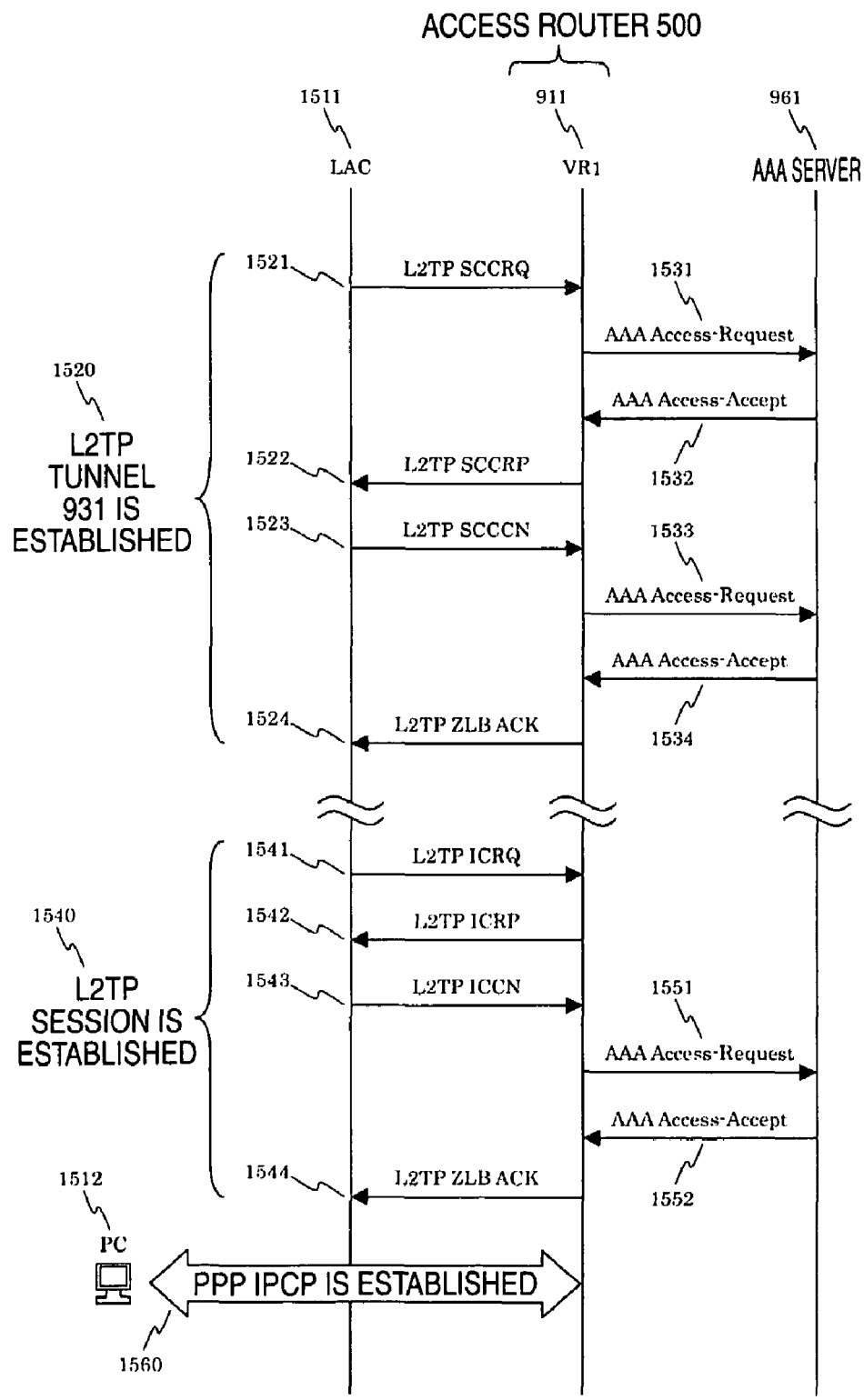
FIG. 15 illustrates an example connection establishment sequence in the mapping method of the fourth embodiment.

FIG. 15 shows an example connection sequence in this embodiment. In the access router configuration of FIG. 2, the execution of the connection sequence is controlled by a sequence control unit 573. The sequence control unit 573, in cooperation with a virtual router management unit 571 and a virtual router configuration table 572, checks whether the operation setting is of LAC type or LNS type and whether the mapping setting is a fixed mapping or L2TP mapping or PPP mapping, and executes the associated sequence of FIG. 12 accordingly.

The LAC of this embodiment therefore offers the following advantages.
1) Unlike the prior art, since a plurality of routing information can be accommodated in a single LNS, connections to a plurality of independent IP networks can easily be realized. Even ISPs with different policies on IP address system, routing information and quality of service can be connected to a single LNS.
2) Since an IP address space of L2TP transfer network and an IP address space of the ISP network can be set and managed independently of each other, restrictions on the design of networks from access network to ISP network can be reduced.
3) Since there is not need to set a complex policy routing and packet filtering for access control between the L2TP transfer network and the ISP network, the operation and management cost can be reduced. Further, since virtual routers can be associated to ISPs in one-to-one relationship, a complete separation of the security domain can be realized.
4) Since the separation between the routing domains of the access line provider and the ISP is realized, the ISP does not have to prepare gateway devices for direct connection with LNS devices.
5) Since the management authority over the LNS device can be transferred to the access line provider/carrier for each virtual router realized in the LNS device, there is a possibility of new business modes arising in which the access line provider may wholesale (transfer or assign the management authority over) any or all of various functions to other carriers.

Fifth Embodiment

Figure 16:
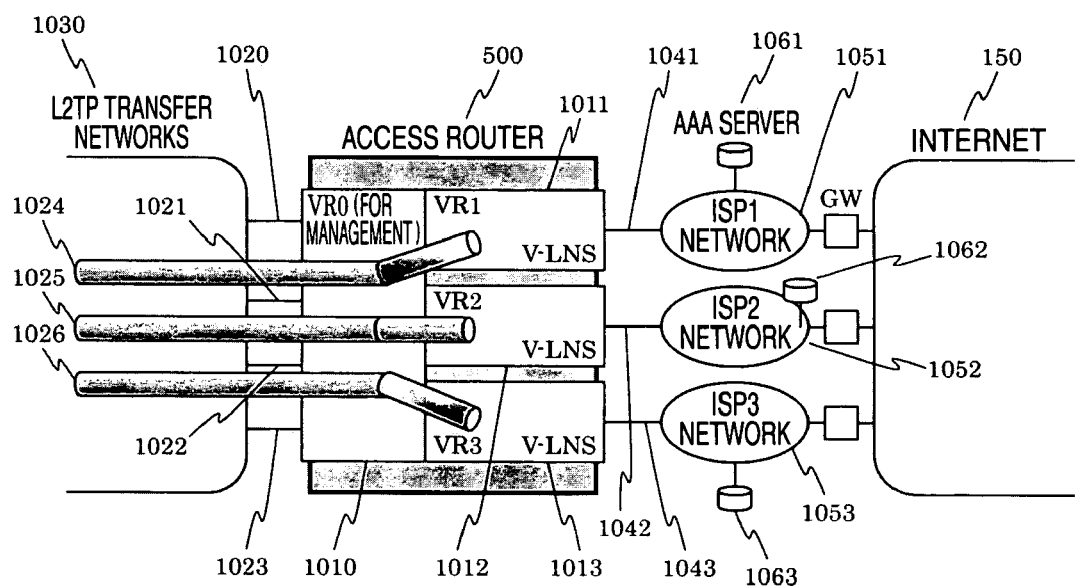
FIG. 16 illustrates an example configuration of a fifth mapping method as a fifth embodiment.

FIG. 16 shows an example implementation of a fifth mapping method (LNS type L2TP mapping method) according to the invention and illustrates a configuration of access router and network.

VR0 (1010) has an administrative authority over the entire access router 500 as in the fourth embodiment and also has a function of managing L2TP transfer network interfaces 1021-1023. L2TP tunnels 1024-1026 and L2TP sessions multiplexed onto these tunnels are received by using the L2TP transfer network interfaces 1021-1023. Packets making up the L2TP tunnels 1024-1026 and the L2TP sessions multiplexed onto them are UDP/IP packets, and the IP layer and UDP layer are terminated in VR0 (1010). The VR0 (1010), which has internal logical interfaces corresponding to the L2TP tunnels 1024-1026, are fixedly mapped to VR1-3 (1011-1013). As a result, the L2TP tunnels 1024-1026 are mapped to VR1-3 (1011-1013) and the L2TP layer is terminated in these virtual routers to which the tunnels are mapped.

FIG. 17A and FIG. 17B show a content of logical I/F table 545 and the routing information table 546 used in this embodiment. The logical I/F table has a virtual router field 2401 for storing virtual router identifiers, a physical I/F field 2402 for storing physical I/F identifiers, a protocol field 2403 for storing identifiers representing a kind of protocol of a received packet, a logical I/F field 2404 for storing logical I/F identifiers, a direction field 2405 for storing a value indicating whether the physical I/F and logical I/F of interest are a communication I/F to transmit packets or one to receive them, an action field 2406 for storing information specifying processing to be executed on the packet, and a virtual router field

2407. A physical I/F identifier may use, for example, an appropriate number added to the protocol used by that session to which the received packet belongs, such as ATM_11 and Ether_12, or simply use a port number.

The routing information table 546 has a virtual router field 2411 for storing virtual router identifiers, a destination IP address field 2412 for storing destination IP addresses of received packets, an address mask field 2413 for storing an address mask, a self-address field 2414 for storing an identifier indicating whether a packet to be processed is a self-addressed packet or not, a next hop address field 2415 for storing an address of a next hop node, a physical I/F field 2416 for storing physical I/F identifiers, and a logical I/F field 2417 for storing logical I/F identifiers.

A mapping method will be described by referring to the logical I/F table of FIG. 17A and the routing information table of FIG. 17B.

Values stored in each field are the same as those shown in the fourth embodiment except for the virtual router identifier field. During an upstream search, entries are searched in the order from line 2421 to line 2428. When line 2423 is retrieved, a L2TP packet (=IP packet) is received by VR_0 and, after IP and UDP are terminated (packet is decapsulated), is mapped to VR_1. When line 2424 is retrieved, L2TP and PPP are terminated (packet is decapsulated) at VR_1 and the user IP packet is routed to an ISP network according to the routing information. During a downstream search, entries are searched in the order from line 2431 to line 2438. When line 2434 is retrieved, an IP packet addressed to a user terminal such as PC is received by VR_1 and, after being encapsulated into PPP and L2TP, mapped to VR_0. When line 2435 is retrieved, the L2TP packet (=IP packet) is routed to the LAC device according to the routing information of VR_0.

The VR0 (1010) is a dedicated virtual router for management by an access line provider and a carrier having a L2TP transfer network 1030 and at the same time is a "representative VR" in that it manages all L2TP transfer network interfaces 1021-1023, terminates the IP layer and UDP layer of all L2TP packets and also manages the mapping of L2TP tunnels to VR1-3 (1011-1013). The VR1-3 (1011-1013), destinations of L2TP tunnel mapping, are equivalent to a conventional LNS type access router in that they perform user authentication in cooperation with AAA servers 1061-1063 and establishes PPP sessions with user terminals such as PCs. This is represented by "V-LNS" (Virtual-LNS) marked at the lower right of VR1-3 (1011-1013) in the figure.

While in this embodiment the interface 1020 is contemplated to be a management-dedicated interface similar to the interface 920 in the fourth embodiment, it need not be dedicated for management if connections are made to the L2TP transfer network 1030 to realize a remote log in. As with the interfaces 1021-1023, the interface 1020 can also be used for transmission and reception. When for security reasons it is desired to allow a remote log for only a particular interface, it is preferred that the management-dedicated interface and the L2TP packet sending/receiving interface be separated as in this embodiment.

Interfaces 1041-1043 connecting VR1-3 (1011-1013) and ISP1-3 networks (1051-1053) are physical interfaces or fixed logical interfaces fixedly associated with VR1-3 (1011-1013) respectively by the administrative authority of VR0 (1010). IP packets making up user data that user terminals such as PCs send or receive are encapsulated in PPP as they are transmitted from the user terminals to the access router 500. But on the interfaces 1041-1043 they are sent and received as pure IP packets.

The VR1-3 (1011-1013) behave as if they were independent LNS devices. For example, VR1 (1011) can set, independently of other virtual routers VR2 (1012) and VR3 (1013) without having to be aware of their presence, setup information for establishing L2TP tunnels mapped from VR0 (1010), information on AAA server 1061 that cooperates with them when authenticating a user, IP address information, routing control information, quality-of-service control information, etc. As described above, by operating VR1-3 (1011-1013) as independent virtual LNS devices to be connected to ISP1-3 respectively, a single physical cubicle (device) of access router 500 can connect to a plurality of ISPs, as in the fourth embodiment.

The VR1-3 (1011-1013) have management authorities over L2TP tunnels mapped to themselves and interfaces 1041-1043 connecting these tunnels to ISP1-3 networks (1051-1053), but not an administrative authority over the entire access router 500. This means that it is possible for an access line provider or a carrier with a L2TP transfer network 1030 to wholesale (transfer or assign the management authority over) the VR1-3 (1011-1013) as virtual LNS devices to Internet service providers. Since the access line provider or carrier with the L2TP transfer network 1030 has an administrative authority over the VR0 (1010), i.e., an administrative authority over the entire access router 500, they can monitor the operating conditions of the VR1-3 (1011-1013) whose management authorities were assigned to the ISP1-3. The access line provider or carrier with the L2TP transfer network 1030 can also set an authority assignment level as required or issue a mandatory command based on a supervisor authority. Further, by separating VR0 (1010) connecting to the L2TP transfer network 1030 from VR1-3 (1011-1013) connecting to the ISP1-3 networks (1051-1053), it is possible for different carriers to perform different management operations whose management authorities are clearly separated. For example, the IP address space of the L2TP transfer network may be managed by the access line provider or carrier with the L2TP transfer network 1030 and the PPP sessions including user authentication may be managed by ISPs. Another feature is that since L2TP tunnels and L2TP sessions multiplexed onto these tunnels are terminated by VR1-3 (1011-1013), the operation and management of the L2TP tunnels and the L2TP sessions multiplexed on these tunnels can be entrusted to respective ISPs. When for security reasons it is desired to hide the operation and management associated with L2TP from ISP, it is possible to limit access to L2TP-related setting commands in VR1-3 (1011-1013).

With the conventional technology shown in FIG. 1, GW141 is required for connection between LSN131 and ISP1 network 142. In this embodiment, on the other hand, VR0 (1010) plays a role of a virtual edge node that terminates the IP address space on the L2TP transfer network 1030 side, and VR1-3 (1011-1013) work as virtual edge nodes that terminate the IP address space on the side of the ISP1-3 networks (1051-1053). That is, VR1-3 (1011-1013) themselves can function as gateway routers. For example, the routing protocols, such as OSPF and BGP, for automating the routing control can be run on VR0-3 (1010-1013) independently of each other. In that case, VR0 (1010) can constitute an edge of the routing control domain on the L2TP transfer net work 1030 side and VR1-3 (1011-1013) form edges of the routing control domain on the side of the ISP1-3 networks (1051-1053). Further, since internal data transfers between VR0 (1010) and VR1-3 (1011-1013) are performed by L2TP layer mapping, there is no IP layer interaction between VR0 (1010) and VR1-3 (1011-1013). Therefore, a problematic situation in which pure IP packets are transmitted between the L2TP transfer network 1030 and the ISP1-3 networks (1051-1053), as experienced with the conventional technology or the fourth embodiment, can not inherently occur. So a strong security is ensured between the access line provider or relay provider and the ISP1-3. Further, since the presence of the L2TP transfer network 1030 is completely concealed from the user terminals such as PCs and no IP communication can inherently take place between the user terminals and the nodes in the L2TP transfer network 1030, there is no need to make a policy routing setting, as required by the prior art technology or the fourth embodiment, that forcibly routes IP packets VR1-3 (1011-1013) have received on PPP sessions to the ISP1-3 networks (1051-1053). As described above, by wholesaling the VR1-3 (1011-1013) as virtual LNS devices having a gateway function, the gateway routers that would otherwise be required can be obviated in this embodiment. Therefore, ISP1-3 do not have to install expensive gateway routers to accommodate interfaces 1041-1043 in their own networks 1151-1153 but can use inexpensive layer 2 switch or layer 3 switch instead.

The L2TP transfer network interfaces 1031-1033 may be independent physical interfaces or fixed logical interfaces multiplexed to a single physical interface. Examples of the fixed logical interfaces include ATM PVC, IEEE802.1Q TAG VLAN, and MPLS label routing. For the access router 500 to perform the minimum required functions as the LNS device, at least one L2TP transfer network interface need only be used. Among merits that result from the use of a plurality of L2TP transfer network interfaces, as in this embodiment, are reinforced bands and redundant, diverse routings in the communication between the L2TP transfer network 1030 and the VR0 (1010). These advantages are similar to those obtained when using the conventional technology of FIG. 1.

There are no particular associations between the L2TP transfer network interfaces 1021-1023 and the L2TP tunnels 1024-1026. For example, since L2TP packets making up the L2TP tunnel 1024 are transmitted and received as ordinary IP packets, they are forwarded according to the routing information table of each router at times of transmission and reception. Thus, which of the L2TP transfer network interfaces 1021-1023 is used to send and receive the L2TP packets is not fixed. So, when the routing information changes as a result of changes in the configuration of the L2TP transfer network 1030 or troubles in any of the L2TP transfer network interfaces, the L2TP packets are forwarded according to the changed routing information table. Take for example a case where the L2TP transfer network interface 1021 that has been running so far fails for some reason. Even in that case, switching to a routing using the L2TP transfer network interface 1022 or 1023 enables the L2TP packets to continue to be transmitted or received. This is the same as with the conventional technology of FIG. 1.

Figure 18:
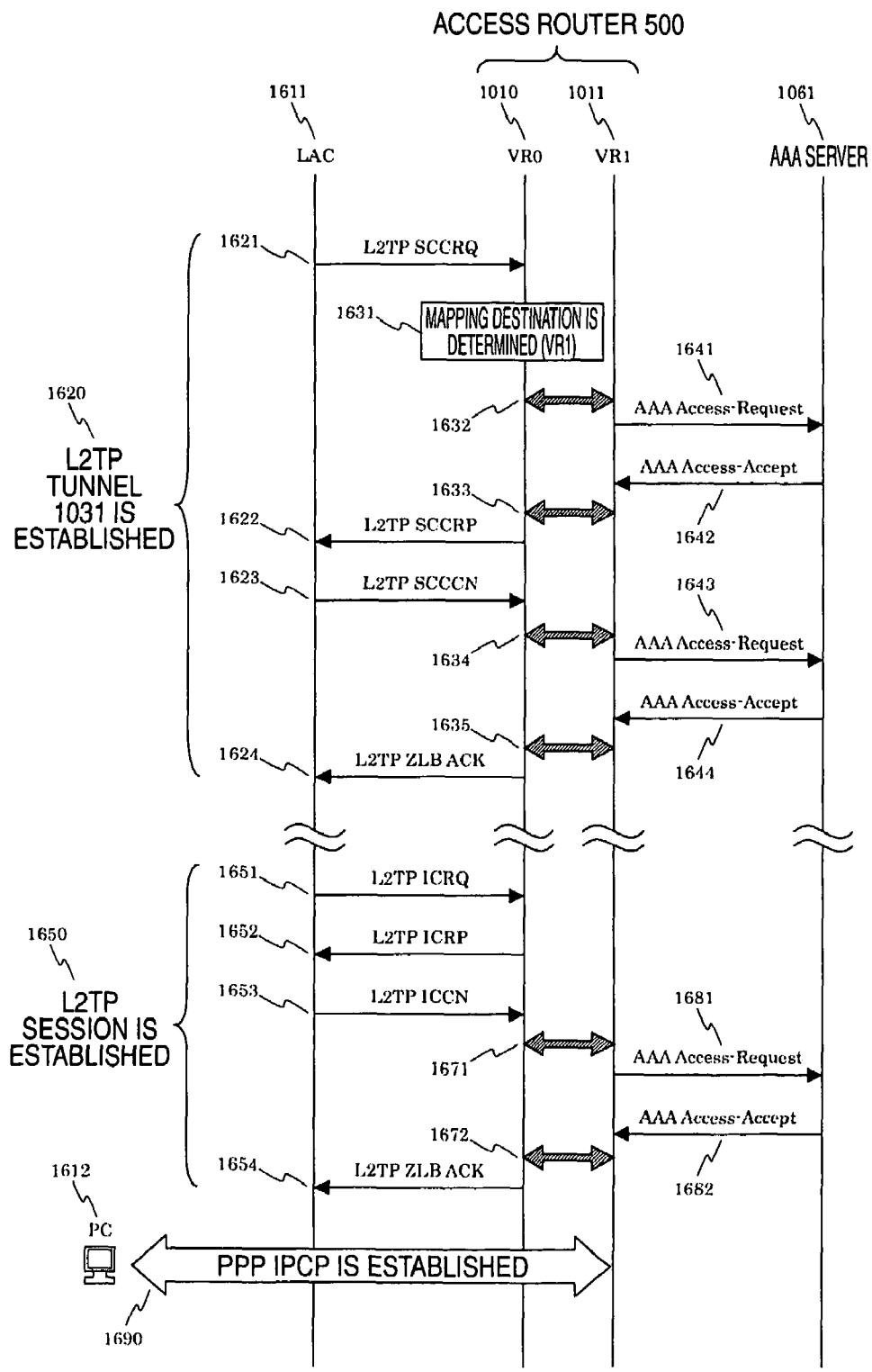
FIG. 18 illustrates an example connection establishment sequence in the mapping method of the fifth embodiment.

FIG. 18 illustrates an example connection sequence in this embodiment. In the access router configuration of FIG. 2, the execution of the connection sequence is controlled by a sequence control unit 573. The sequence control unit 573, in cooperation with a virtual router management unit 571 and a virtual router configuration table 572, checks whether the operation setting is of LAC type or LNS type and whether the mapping setting is a fixed mapping or L2TP mapping or PPP mapping, and executes the associated sequence of FIG. 18 accordingly.

In addition to the five advantages of the fourth embodiment, the LNS of this embodiment offers the following advantages.

Unlike the fourth embodiment, there is no need for additional gateway router for connection with ISP networks.

The virtual routers on the ISP network side can be wholesaled as gateways for the ISPs themselves so that ISPs can freely design routing domains and security domains.

Sixth Embodiment

Figure 19:
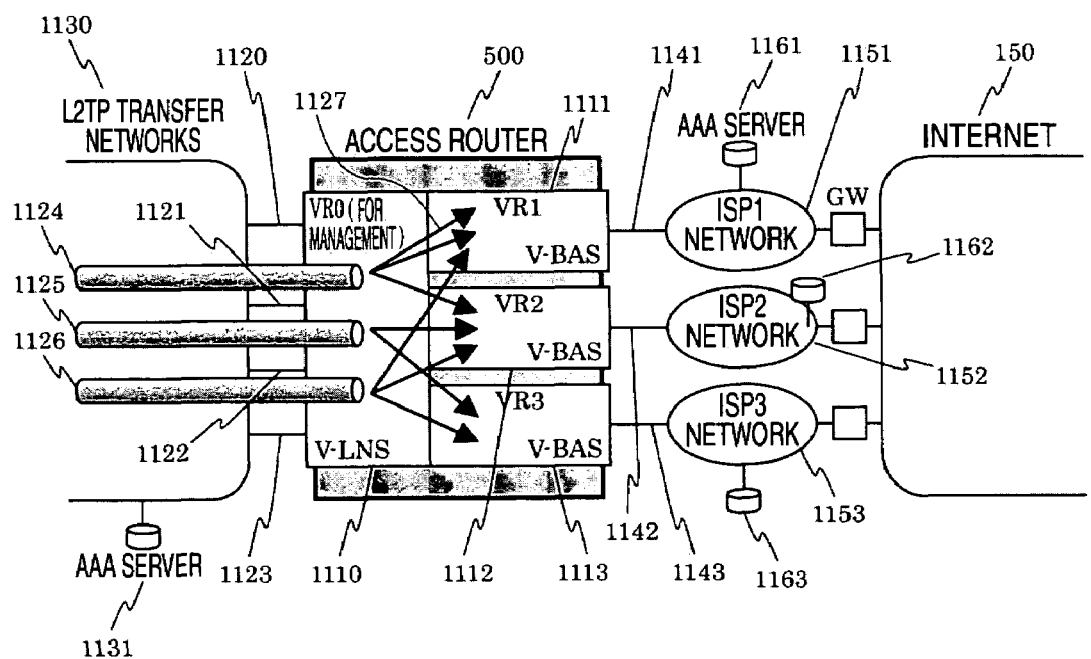
FIG. 19 illustrates an example configuration of a sixth mapping method as a sixth embodiment.

FIG. 19 shows an example implementation of a sixth mapping method (LNS type PPP mapping method) according to the invention and illustrates a configuration of access router and network.

VR0 (1110) has an administrative authority over the entire access router 500 as in the fourth embodiment and also has a function of managing L2TP transfer network interfaces 1121-1123 as in the fifth embodiment. L2TP tunnels 1124-1126 and L2TP sessions multiplexed to these tunnels are received by using the L2TP transfer network interfaces 1021-1023 and completely terminated at VR0 (1110). That is, L2TP packets making up the L2TP tunnels 1124-1126 are removed of a L2TP header at VR0 (1110) to extract a PPP frame. Each of these PPP sessions picked up from the L2TP tunnels 1124-1126 is mapped to each of VR1-3 (1111-1113) and terminated at each VR to which it is mapped. Information used for this mapping may be arbitrary attribute information that can take a different value for a different PPP session, as with the third embodiment. Examples of such attribute information includes a variety of information that LAC notifies in the form of ICCN messages when sessions are set up (ISP identification information in user identification character string, various parameter values obtained as a result of negotiations in LCP phase, transmission speed, private group ID, etc.), VR1-3 (1111-1113) resource occupation information when a L2TP session connection request is received, and congestion information on ISP1-3 networks 1151-1153 retrieved from AAA servers 1161-1163 or other network monitoring servers.

FIG. 20A and FIG. 20B show a content of logical I/F table 545 and the routing information table 546 used in this embodiment. The logical I/F table has a virtual router field 2501 for storing virtual router identifiers, a physical I/F field 2502 for storing physical I/F identifiers, a protocol field 2503 for storing identifiers representing a kind of protocol of a received packet, a logical I/F field 2504 for storing logical I/F identifiers, a direction field 2505 for storing a value indicating whether the physical I/F and logical I/F of interest is a communication I/F to transmit packets or one to receive them, an action field 2506 for storing information specifying processing to be executed on the packet, and a virtual router field 2507. A physical I/F identifier may use, for example, an appropriate number added to the type of line assigned to physical I/F, such as ATM_11 and Ether_12, or simply use a port number.

The routing information table 546 has a virtual router field 2511 for storing virtual router identifiers, a destination IP address field 2512 for storing destination IP addresses of received packets, an address mask field 2513 for storing an address mask, a self-address field 2514 for storing an identifier indicating whether a packet to be processed is a self-addressed packet or not, a next hop address field 2515 for storing an address of a next hop node, a physical I/F field 2516 for storing physical I/F identifiers, and a logical I/F field 2517 for storing logical I/F identifiers.

A mapping method will be described by referring to the logical I/F table of FIG. 20A and the routing information table of FIG. 20B. Values stored in each field are the same as those shown in the fourth embodiment except for the virtual router identifier field. During an upstream search, entries are searched in the order from line 2521 to line 2528. During the search for lines 2521 to 2524, L2TP packets (=IP packets) are received by VR_0 and, after the L2TP is terminated (decapsulated), are mapped to VR_1. During the search for lines 2525-2532, PPP is terminated (decapsulated) at VR_1 and the packets are routed to ISP networks according to the routing information of VR_1. During a downstream search, entries are searched in the order from line 2531 to line 2538. During the search for lines 2531-2533, IP packets destined to user terminals such as PCs are received by VR_1 and, after being encapsulated in PPP, are mapped to VR_0. During the search for lines 2534-2538, the PPP is further encapsulated in L2TP and the L2TP packets (=IP packets) are routed to LAC device according to the routing information in VR_0.

With this embodiment that performs dynamic mapping to the virtual router for each PPP session, it is possible to make network designs and provide services in a variety of modes that are not possible so far. As an example, when the mapping is performed based on the ISP identification information in a user identification character string (e.g. "isp1.co.jp"), sessions of the users using a common access menu for ISP1-3 can be multiplexed to a common L2TP tunnel regardless of which ISP the session is addressed to. For example, ADSL user sessions of 1.5 Mbps may be multiplexed to the L2TP tunnel 1124, ADSL user sessions of 8 Mbps to the L2TP tunnel 1125, and FTTH user sessions of 100 Mbps to the L2TP tunnel 1126. This makes it possible to make a detailed design on the routing control and bandwidth control in the L2TP transfer network 1130 for each service menu. As another example, when the mapping is performed based on congestion information on ISP1-3 networks 1151-1153, a new type of service becomes possible in which the ISP1-3 form a virtual provider that connects a user to one of the ISPs that is least congested when the user makes a connection request.

The VR0 (1110) is a dedicated virtual router for management by an access line provider or a carrier having a L2TP transfer network 1130 and at the same time is a "representative VR" in that it manages all L2TP transfer network interfaces 1121-1123, terminates all L2TP tunnels and L2TP sessions multiplexed to these tunnels and also manages the mapping of extracted PPP sessions to VR1-3 (1111-1113). The VR0 (1110) is similar to the conventional LNS type access router in that it terminates L2TP. This is represented by "V-LNS" (Virtual-LNS) marked at the lower left of VR0 (1110) in FIG. 19. The VR1-3 (1111-1113), destinations of the PPP session mapping, are similar to a conventional BAS (Broadband Access Server) type access router in that they perform user authentication in cooperation with AAA servers 1161-1163 and establishes PPP sessions with user terminals such as PCs. This is represented by "V-BAS" (Virtual-BAS) marked at the lower right of VR1-3 (1111-1113) in FIG. 19.

While in this embodiment the interface 1120 is contemplated to be a management-dedicated interface similar to the interface 920 in the fourth embodiment, it need not be dedicated for management if connections are made to the L2TP transfer network 1130 to achieve a remote log in. As with the interfaces 1121-1123, the interface 1120 can also be used for L2TP packet transmission and reception. When for security reasons it is desired to allow a remote login for only a particular interface, it is preferred that the management-dedicated interface and the L2TP packet sending/receiving interface be separated as in this embodiment.

Interfaces 1141-1143 connecting VR1-3 (1111-1113) and ISP1-3 networks (1151-1153) are physical interfaces or fixed logical interfaces fixedly associated with VR1-3 (1111-1113) respectively by the administrative authority of VR0 (1110). IP packets making up user data that a user terminal such as PC send or receive are encapsulated in PPP as they are transmitted between the user terminal and the access router 500. But on the interfaces 1141-1143 they are sent and received as pure IP packets.

The mapping settings on these fixed logical interfaces are made explicitly as by command setting and are not automatically generated or erased during the operation of the access router 500 nor replaced with different mapping settings. Examples include ATM PVC, IEEE802.1Q TAG VLAN, MPLS label routing, and sub-interface which is a setting unit for each of protocols multiplexed on the physical interface.

The VR1-3 (1111-1113) behave as if they were independent BAS devices. For example, VR1 (1111) can set, independently of other virtual routers VR2 (1112) and VR3 (1113) without having to be aware of their presence, information on the AAA server 1161 that cooperates with VR1 (1111) itself when establishing PPP sessions mapped from VR0 (1110), IP address information, routing control information, quality-of-service information, etc.

As described above, by operating VR1-3 (1111-1113) as independent virtual BAS devices to be connected to ISP1-3 respectively, a single physical chassis (device) of access router 500 can connect to a plurality of ISPs, as in the fourth and fifth embodiment.

The VR1-3 (1111-1113) have management authorities over PPP sessions mapped to themselves and over interfaces 1141-1143 that connect them to ISP1-3 networks (1151-1153) respectively, but not an administrative authority over the entire access router 500. This means that it is possible for an access line provider or a carrier with a L2TP transfer network 1130 to wholesale (transfer or assign the management authority over) the VR1-3 (1111-1113) as virtual BAS devices to Internet service providers 1-3. Since the access line provider or carrier with the L2TP transfer network 1130 has an administrative authority over the VR0 (1110), i.e., an administrative authority over the entire access router 500, they can monitor the operating conditions of the VR1-3 (1111-1113) whose management authorities were assigned to the ISP1-3. The access line provider or carrier with the L2TP transfer network 1130 can also set an authority assignment level as required or issue a mandatory command based on a supervisor authority. Further, by separating VR0 (1110) connecting to the L2TP transfer network 1130 from VR1-3 (1111-1113) connecting to the ISP1-3 networks (1151-1153), it is possible for different carriers to perform different management operations whose management authorities are clearly separated. For example, the L2TP tunnels and the L2TP sessions multiplexed to these tunnels may be managed by the access line provider or carrier with the L2TP transfer network 1130 and the PPP sessions including user authentication may be managed by ISPs.

With the conventional technology shown in FIG. 1, GW141 is required for connection between LNS131 and ISP1 network 142. In this embodiment, on the other hand, VR0 (1110) plays a role of a virtual edge node that terminates the IP address space on the L2TP transfer network 1130 side, and VR1-3 (1111-1113) work as virtual edge nodes that terminate the IP address space on the side of the ISP1-3 networks (1151-1153). That is, VR1-3 (1111-1113) themselves can function as gateway routers. For example, the routing protocols, such as OSPF and BGP, for automating the routing control can be run on VR0-3 (1110-1113) independently of each other. In that case, VR0 (1110) can constitute an edge of the routing control domain on the L2TP transfer network 1130 side and VR1-3 (1111-1113) form edges of the routing control domain on the side of the ISP1-3 networks (1151-1153). Further, since internal data transfers between VR0

(1110) and VR1-3 (1111-1113) are performed by PPP layer mapping, there is no IP layer interaction between VR0 (1110) and VR1-3 (1111-1113). Therefore, a problematic situation in which pure IP packets are transmitted between the L2TP transfer network 1130 and the ISP1-3 networks (1151-1153), as experienced with the conventional technology or the fourth embodiment, can not inherently occur. So a strong security is ensured between the access line provider or relay carrier and the ISP1-3. Further, since the presence of the L2TP transfer network 1130 is completely concealed from the user terminals such as PCs and no IP communication can inherently take place between the user terminals and the nodes in the L2TP transfer network 1130, there is no need to make a policy routing setting, as required by the prior art technology or the fourth embodiment, that forcibly routes IP packets VR1-3 (1111-1113) have received on PPP sessions to the ISP1-3 networks (1151-1153). As described above, by wholesaling the VR1-3 (1111-1113) as virtual BAS devices having a gateway function, the gateway routers that would otherwise be required can be obviated in this embodiment. Therefore, ISP1-3 do not have to install expensive gateway routers to accommodate interfaces 1141-1143 in their own networks 1151-1153 but can use inexpensive layer 2 switches or layer 3 switches instead.

The L2TP transfer network interfaces 1131-1133 may be independent physical interfaces or fixed logical interfaces multiplexed to a single physical interface. Examples of the fixed logical interfaces include ATM PVC, IEEE802.1Q TAG VLAN, and MPLS label routing. For the access router 500 to perform the minimum required functions as the LNS device, at least one L2TP transfer network interface need only to be used. Among merits that result from the use of a plurality of L2TP transfer network interfaces, as in this embodiment, are reinforced bandwidth and redundant, multiple routes in the communication between the L2TP transfer network 1130 and the VR0 (1110). These advantages are similar to those obtained when using the conventional technology of FIG. 1.

There are no particular associations between the L2TP transfer network interfaces 1121-1123 and the L2TP tunnels 1124-1126. For example, since L2TP packets making up the L2TP tunnel 1124 are transmitted and received as ordinary IP packets, they are forwarded by each router according to its routing information table at times of transmission and reception. Thus, which of the L2TP transfer network interfaces 1121-1123 is used to send and receive the L2TP packets is not fixed. So, when the routing information changes as a result of changes in the configuration of the L2TP transfer network 1130 or troubles in any of the L2TP transfer network interfaces, the L2TP packets are forwarded according to the changed routing information table. Take for example a case where the L2TP transfer network interface 1121 that has been running so far fails for some reason. Even in that case, switching to a route using the L2TP transfer network interface 1122 or 1123 enables the L2TP packets to continue to be transmitted or received. This is the same as with the conventional technology of FIG. 1.

When the L2TP tunnels 1124-1126 are to be established with the LAC devices, the tunnel setup information is set in the VR0 (1110). Alternatively, it is possible to query the AAA server 1131 to retrieve the tunnel setup information without setting it in the VR0 (1110). Examples of such tunnel setup information include a tunnel ID, a tunnel password, a LAC device identification character string, a LNS device identification character string, a tunnel termination IP address on LAC side, and a tunnel termination IP address on LNS side. In addition to managing the tunnel setup information, the AAA server 1131 can also be used as an external database server that collects and store accounting information on L2TP tunnels and L2TP sessions multiplexed to these tunnels. Examples of such accounting information include a tunnel ID, a session ID, a user information character string, a duration of tunnel or session, a transmission/reception octet number, and a transmitted/received packet number. Managing the tunnel setup information and accounting information by using such an external server allows for an efficient operation and management of a large number of LAC devices and LNS devices in a large-scale L2TP network.

With LNS devices using conventional technologies, it has been possible to set independent AAA servers, one for authentication and one for accounting. However, the conventional LNS devices could not set different AAA servers for L2TP protocol management (AAA server 1131) and for PPP protocol management (AAA servers 1161-1163), as can be done in this embodiment. The main purpose of the AAA server in the LNS device has been a user authentication and a PPP session accounting in ISP, so that the AAA server is often installed in the ISP network, as in the case of the AAA server 143. As the L2TP transfer network becomes larger in scale, a demand increases for the AAA server also managing the L2TP protocol. However, since the L2TP protocol is under the control of an access line provider or a carrier with L2TP transfer network 1130, assigning the management of the L2TP protocol to the AAA server installed in an ISP network is not desirable from a standpoint of business operation and security. This embodiment offers a natural solution to this limitation experienced with the conventional LNS devices by separating VR0 (1110) that terminates the L2TP protocol and VR1-3 (1111-1113) that terminate the PPP protocol, and installing the AAA server 1131 that manages the L2TP protocol in the L2TP transfer network 1130 and the AAA servers 1161-1163 that manage the PPP protocol including user authorization in the ISP1-3 networks (1151-1153). If situation demands, it is possible to set one AAA server 1131 for managing L2TP tunnel setup information and another for managing the accounting information on L2TP tunnels and sessions.

As described above, this mapping method can solve the aforementioned problems 1-6 experienced with LNS.

Figure 21:
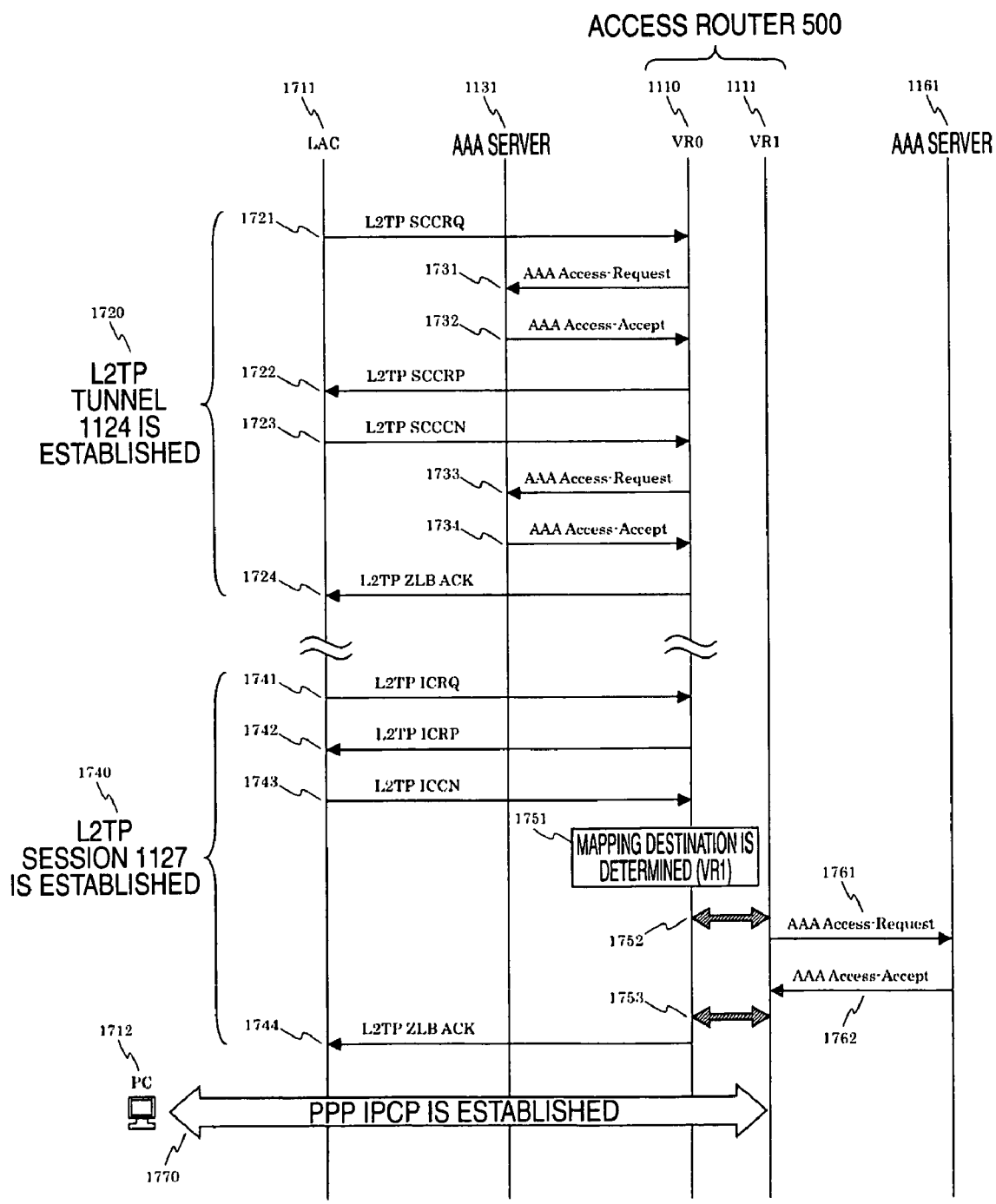
FIG. 21 illustrates an example connection establishment sequence in the mapping method of the sixth embodiment.

FIG. 21 illustrates an example connection establishment sequence (of LNS type PPP mapping method) in this embodiment. This represents a normal sequence until the access router 500 establishes a L2TP tunnel 1124 shown in FIG. 19 and a L2TP session 1127 multiplexed to this tunnel. The following explanation is not unique to the access router configuration shown in FIG. 2 but describes a logical working between virtual routers. In the access router configuration shown in FIG. 2, a main entity that executes the sequence is the sequence control unit 573. So an expression "VR0 executes a certain action" in the following explanation can be read as "in a context of a virtual router identifier representing VR0, the sequence control unit 573 executes a certain action."

Steps 1721-1724 and 1741-1744 between LAC 1711 and VR0 (1110) are a normal connection establishment sequence of L2TP protocol specified by RFC2661. Steps 1731-1734 between VR0 (1110) and AAA server 1131 and steps 1761, 1762 between VR1 (1111) and AAA server 1161 can use, for example, one round-trip query sequence specified by the RADIUS protocol. While the access router 500 can control an overall sequence internally through the cooperation among the virtual routers, individual external sequences do not add any changes to the conventional standard technology.

A setup sequence 1720 for L2TP tunnel 1124 comprises steps 1721-1724 between LAC 1711 and VR0 (1110) and steps 1731-1734 between VR0 (1110) and AAA server 1131.

The step 1731 is a query about tunnel setup information held in the AAA server 1131. Based on a query result received in step 1732, VR0 or the sequence control process specifies parameters in step 1722. If VR0 (1110) itself holds tunnel setup information locally, the query steps 1731, 1732 are not necessary.

Step 1733 is a tunnel authentication request to AAA server 1131. If an authentication result received in step 1734 means OK, step 1724 notifies LAC 1711 that the connection is established. If VR0 (1110) itself holds an authorization password locally or if the tunnel authentication is not performed, the query steps 1733, 1734 are not necessary.

A setup sequence 1740 for L2TP session 1127 comprises steps 1741-1744 between LAC 1711 and VR0 (1110) and steps 1761-1764 between VR1 (1111) and AAA server 1161. In connection with these external sequences, internal coordinated steps 1751-1753 between VR0 (1110) and VR1 (1111) are executed.

When LAC 1711 in step 1743 notifies the session attribute information to VR0 (1110), VR0 (1110) applies a predefined mapping rule to the session attribute information or other attribute information to determine VR1 (1111) as a mapping destination of L2TP session 1127. Details of attribute information to which the mapping rule can be applied are as shown earlier.

After the mapping destination is determined to be VR1 (1111), VR0 (1110) in step 1752 requests VR1 (1111) to execute user authentication. VR1 (1111) in step 1761 queries AAA server 1161 for user authentication. If VR1 (1111) itself holds an authentication database locally or if the authentication itself is not performed, the query steps 1761, 1762 are not necessary. When step 1762 returns an authentication acknowledged notification, VR1 (1111) in step 1753 notifies the authentication completion to VR0 (1110). At the same time, VR0 (1110) sets up an internal resource for L2TP session 1127 and VR1 (1111) sets up an internal resource for the corresponding PPP session to link the two virtual routers. VR0 (1110) in step 1744 notifies the L2TP session has been established to LAC 1711, completing the setup procedure for L2TP session 1127. This is followed by an IPCP phase 1770 of PPP, which is performed between user terminal 1712 such as PC and VR1 (1011).

Though not shown in FIG. 17, an accounting sequence to collect statistical information about L2TP tunnels and L2TP sessions multiplexed to these tunnels can be executed between VR0 (1110) and AAA server 1131. This sequence may, for example, be executed when a connection or disconnection of L2TP tunnels or L2TP sessions takes place, or be executed at periodical intervals, for instance every 10 minutes. Similarly, between VR1 (1111) and AAA server 1161, an accounting sequence to collect statistical information about PPP sessions mapped to VR1 (1111) can be executed. This sequence may be executed when a connection or disconnection of PPP sessions occurs, or be executed at periodic intervals, for instance every 10 minutes.

LNS of this embodiment, in addition to the five advantages of the fourth embodiment, offers another advantage of being able to freely multiplexing PPP sessions in a particular L2TP tunnel irrespective of destined ISP. With conventional LNS devices, it is not possible to extract individual PPP sessions from a L2TP tunnel to which the PPP sessions destined for different ISPs have been multiplexed. What the conventional LNS devices can multiplex to a particular L2TP tunnel is only those PPP sessions that are addressed to a particular ISP. Thus, the method of multiplexing in a L2TP transfer network is limited.

Although we have described example embodiments, it is obvious to a person skilled in the art that the present invention is not limited to these embodiments but various modifications and changes can be made without departing from the spirit of the invention and the scope of appended claims.

What is claimed is:

1. An access router comprising:
   a plurality of communication interfaces (I/Fs) to connect to external communication lines;
   a processor which executes predetermined processing on packets transmitted and received through a user terminal and utilizes corresponding relationships to support each of a plurality of virtual routers accommodated therein to perform routing actions independently from other virtual routers; and
   a memory which stores reference information used to execute predetermined packet processing actions on received packets;
   wherein the memory stores the corresponding relationships each defining among a physical interface identifier for identifying a physical interface, a logical interface identifier for identifying a logical interface, a kind of protocol of a received packet, a first virtual router identifier for identifying a first virtual router, a first packet processing action to be executed on the received packet by the first virtual router, a second virtual router identifier for identifying the second virtual router designated to exclusively execute a second packet processing action which is different from first packet processing action, and
   memory further stores routing information to be processed by virtual routers corresponding to the virtual router identifiers, respectively;
   wherein the processor refers to the corresponding relationships and identifies an identifier of the first virtual router that corresponds to a respective L2TP tunnel to process the received packets, and reads from the routing information managed by the first virtual router and forwards the received packets from an receiving logical interface to another interface associated with the second virtual router, and the processor processes a received packet according to a respective protocol and per packet processing action according to a respective individual routing table of the second virtual router,
   wherein each of the plurality of virtual routers functions as the first virtual router to distribute a received packet to the second virtual router which exclusively executes the second packet processing action on the received packet, and
   the second virtual router exclusively executes the second packet processing action on the received packet based on one of the corresponding relationships including one physical interface identifier for identifying the physical interface having received the packet, one logical interface identifier for identifying the logical interface having received the packet, one kind of protocol category of the received packet, and then performs a routing processing with reference to the routing information and outputs the packet.

2. An access router according to claim 1 wherein the corresponding relationships and the routing information are stored in different memories.

3. An access router according to claim 1, wherein L2TP tunnel identifiers, PPP session identifiers or identifiers of Internet service providers connected through external communication lines are used as the logical interface identifiers.

4. An access router according to claim 1, wherein port numbers of the plurality of communication I/Fs are used as the physical interface identifiers.

5. An access router according to claim 1, wherein the processor executes an L2TP Access Concentrator (LAC) function of terminating a plurality of L2TP tunnels or an L2TP Access Concentrator (LAC) function of initiating a plurality of L2TP tunnels for the plurality of virtual routers accommodated therein.

6. An access router according to claim 5, wherein
the memory stores a sequence for generating L2TP tunnels and a sequence for terminating the L2TP tunnels corresponding to received packets, and
the processor reads and executes any of the sequences to realize the LAC function and LNS function.

7. An access router according to claim 5, further comprising a means for switching between the LAC function and the LNS function.

8. An access router according to claim 6, wherein the processor has a setting means for determining which of the sequences is to be read, and switches between the LAC function and the LNS function by the setting means.

9. An access router according to claim 1, further comprising:
a program memory storing a program, the program for analyzing contents of management control commands received by the communication I/Fs;
wherein the processor executes the management control commands to authorize, according to a contract, control command sources to change settings in the corresponding relationships corresponding to all the virtual routers.

10. An access router according to claim 9, wherein the processor executes the management control commands to authorize a particular control command source to change settings in the corresponding relationships corresponding to a particular virtual router.

11. A method for implementing via a virtual access router, comprising:
providing the virtual access router including a plurality of communication I/Fs to connect to external communication lines; a processor which executes predetermined processing on packets transmitted and received through a user terminal and utilizes corresponding relationships to support each of a plurality of virtual routers accommodated therein to perform routing actions independently from other virtual routers; and a memory which stores the corresponding relationships each defining among a physical interface identifier for identifying a physical interface, a logical interface identifier for identifying a logical interface, a kind of protocol of a received packet, a first virtual router identifier for identifying a first virtual router, a first packet processing action to be executed on the received packet by the first virtual router, a second virtual router identifier for identifying the second virtual router designated to exclusively execute a second packet processing action which is different from first packet processing action, and memory further stores routing information to be processed by virtual routers corresponding to the virtual router identifiers, respectively; wherein the processor refers to the interface table and identifies an identifier of a virtual router that corresponds to a respective L2TP tunnel to process the received packets and reads from the routing information managed by the virtual router corresponding to the virtual router identifier and forwards the received packets from an receiving logical interface to another interface associated with a respective virtual router, and the processor processes a received packet according to a respective protocol and per packet processing action according to a respective individual routing table of the respective virtual router; a program memory storing a program, the program for analyzing contents of management control commands received by the communication I/Fs; wherein the processor executes the management control commands to authorize, according to a contract, control command sources to change settings in the corresponding relationships corresponding to all the virtual routers;
by a communication carrier who owns or manages the virtual access routers, associating interfaces connecting to networks of other communication carriers with particular virtual routers, and transferring to the other communication carriers authorities to use management control commands corresponding to the virtual routers;
distributing by each of the plurality of virtual routers functioning as the first virtual router a received packet to the second virtual router which exclusively executes the second packet processing action on the received packet; and
exclusively executing by the second virtual router the second packet processing action on the received packet based on one of the corresponding relationships including one physical interface identifier for identifying the physical interface having received the packet, one logical interface identifier for identifying the logical interface having received the packet, one kind of protocol category of the received packet, and then performing a routing processing with reference to the routing information and outputs the packet.

12. A virtual access router according to claim 1, wherein in a case where the logical interface identifier is not directly related to the physical interface identifier,
the corresponding relationships each includes an independent entry including the logical interface identifier but excluding any of the physical interface identifiers, and
a packet received by the communication I/F is subjected to a protocol processing by corresponding one of the virtual routers based on an entry including corresponding one of the physical interface identifiers of the corresponding relationships and then subjected to a protocol processing by corresponding one of the virtual routers based on an entry including corresponding one of the virtual interface identifiers of the corresponding relationships.

13. An access router configured with an L2TP Network Server (LNS) function for terminating a plurality of L2TP tunnels and an L2TP Access Concentrator (LAC) function for forming the plurality of L2TP tunnels and a plurality of virtual routers, each of the plurality of virtual routers including at least one of a physical interface and a logical interface and means for distributing a packet received at the physical or logical interface to another one of the plurality of virtual routers, comprising:
a plurality of physical interfaces each of which transmits or receives packets to/from an external communication line; and
a memory which stores corresponding relationships each defining among a physical interface identifier for identifying a physical interface, a logical interface identifier for identifying a logical interface, a kind of protocol of a received packet, a first virtual router identifier for identifying a first virtual router, a first packet processing action to be executed on the received packet by the first virtual router, a second virtual router identifier for identifying the second virtual router designated to exclusively execute a second packet processing action which is different from first packet processing action, and also stores routing information for routing a packet, wherein the logical interfaces are multiplexed on the physical interfaces, each of the plurality of virtual routers functions as the first virtual router to distribute a received packet to the second virtual router which exclusively executes the second packet processing action on the received packet, and the second virtual router exclusively executes the second packet processing action on the received packet based on one of the corresponding relationships including one physical interface identifier for identifying the physical interface having received the packet, one logical interface identifier for identifying the logical interface having received the packet, one kind of protocol category of the received packet, and then performs a routing processing with reference to the routing information and outputs the packet.

14. An access router according to claim 13, wherein the access router performs the L2TP LAC function, the plurality of virtual routers includes a first virtual router which has a physical interface or a logical interface for transmitting/receiving the first packet via a PPP session with a user terminal, and a second virtual router which has a physical interface or a logical interface for transmitting/receiving the second packet and establishing an L2TP tunnel with the first virtual router thereby functioning as an L2TP LNS device, and the first virtual router encapsulates the first packet received via the PPP session into the second packet and send the second packet via the L2TP tunnel to the second virtual router as the first packet processing action, and distributes the second packet via the L2TP tunnel to the second virtual router.

15. An access router according to claim 13, wherein the access router performs the L2TP LAC function, the plurality of virtual routers includes a first virtual router which has a physical interface or a logical interface for transmitting/receiving the first packet via a PPP session with a user terminal, and a second virtual router which has a physical interface or a logical interface for transmitting/receiving the second packet and establishing an L2TP tunnel with the first virtual router thereby functioning as an L2TP LNS device, and the first virtual router distributes the first packet via the PPP session to the second virtual router, and the second virtual router encapsulates the first packets into the second packet and distributes the second packet via L2TP tunnel as the second packet processing action.

16. An access router according to claim 13, wherein the access router performs the L2TP LNS function, the plurality of virtual routers includes a first virtual router which has a physical interface or a logical interface for transmitting/receiving the first packet and establishing an L2TP tunnel thereby functioning as an L2TP LAC device, and a second virtual router which has a physical interface or a logical interface for transmitting/receiving the second packet from a backbone network, the first packet is a IP packet, and the first virtual router establishes the L2TP tunnel and distributes the first packet via the L2TP tunnel to the second virtual router, and the second virtual router terminates the L2TP tunnel and decapsulates content encapsulated in the second packet via a PPP session as the second packet processing action.

17. An access router according to claim 13, wherein the access router performs the L2TP LNS function, the plurality of virtual routers includes a first virtual router which has a physical interface or a logical interface for transmitting/receiving the first packet and establishing an L2TP tunnel thereby functioning as an L2TP LAC device, and a second virtual router which has a physical interface or a logical interface for transmitting/receiving the second packet from a backbone network, the first packet is a IP packet, and the first virtual router establishes the L2TP tunnel, decapsulates content encapsulated in the first packet via a PPP session into the second packet, distributes the second packet to the second virtual router as the first packet processing action, and the second virtual router terminates the L2TP tunnel as the second packet processing action.

18. An access router according to claim 13, wherein the memory stores therein a table which has a virtual router field for storing virtual router identifiers, a destination IP address field for storing destination IP addresses of received packets, an address mask field for storing address masks, a self-address field for storing identifiers each indicating whether a packet to be processed is a self-addressed packet or not, a next hop address field for storing addresses each of a device to which a packet is to be transferred next, a physical interface field for storing physical interface identifiers, and a logical interface field for storing logical interface identifiers.

19. An access router according to claim 13, wherein by a control command received by one of the physical interfaces or the logical interfaces, a correspondence between the physical or logical interfaces and the virtual routers is changed, and the packet processing action and the virtual router to be distributed is changed in each of the virtual routers.

* * * * *